US012803697B2

(12) United States Patent
Buset et al.

(10) Patent No.: US 12,803,697 B2
(45) Date of Patent: Nov. 17, 2026

(54) ASE IDLER PASSBAND PROTECTION FOR TERRESTRIAL OPTICAL NETWORK APPLICATIONS

(71) Applicant: Infinera Corp., San Jose, CA (US)

(72) Inventors: Jonathan Michael Buset, San Jose, CA (US); Nisar Ahmed, Bellevue, WA (US); Sanjeev Ramachandran, Manipal (IN); Ashok Kunjidhapatham, Karnataka (IN); Thomas Gerard, Campbell, CA (US); Francisco Javier Vaquero Caballero, San Jose, CA (US)

(73) Assignee: Infinera Corp.

( * ) Notice: Subject to any disclaimer, the term of this patent is extended or adjusted under 35 U.S.C. 154(b) by 214 days.

(21) Appl. No.: 18/902,074

(22) Filed: Sep. 30, 2024

(65) Prior Publication Data

US 2025/0112722 A1 Apr. 3, 2025

Related U.S. Application Data

(60) Provisional application No. 63/541,606, filed on Sep. 29, 2023, provisional application No. 63/541,665, filed on Sep. 29, 2023.

(51) Int. Cl.
*H04J 14/02* (2006.01)

(52) U.S. Cl.
CPC ...... *H04J 14/0221* (2013.01); *H04J 14/0212* (2013.01)

(58) Field of Classification Search
None
See application file for complete search history.

(56) References Cited

U.S. PATENT DOCUMENTS

2022/0060256 A1 * 2/2022 Pratapa ................ H04B 10/032

* cited by examiner

*Primary Examiner* — David W Lambert

(57) ABSTRACT

A network element is disclosed herein. The network element comprises an ASE source generating ASE noise, a first WSS receiving a first optical signal comprising USPs having an expected power, a second WSS to attenuate ASE noise into ASE passbands and multiplexes the ASE passbands and the first optical signal into a second optical signal having second passbands, a spectral measurement device to detect optical power, and a controller having a processor and memory storing instructions causing the processor to: receive an optical power of the first optical signal from the spectral measurement device; detect a passband failure based on the optical power, the passband failure associated with a failed passband being one of: the USPs; generate the ASE passband; cause the second WSS to multiplex the ASE passband into the second optical signal; and cause the second WSS to activate the ASE passband to replace the failed passband.

20 Claims, 11 Drawing Sheets

ASE IDLER PASSBAND PROTECTION FOR TERRESTRIAL OPTICAL NETWORK APPLICATIONS

CROSS-REFERENCE TO RELATED APPLICATIONS

This application claims priority to U.S. Provisional Patent Application No. 63/541,606, titled "ASE idler passband protection for terrestrial optical network applications", filed Sep. 29, 2023, and to U.S. Provisional Patent Application No. 63/541,665, titled "ASE Idler Ramping", filed Sep. 29, 2023, the entire contents of each of which are hereby incorporated herein by reference in their entirety.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation, and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems. Although C+L band allows the total spectrum and capacity to be doubled compared to C-band only systems, C+L band systems are more sensitive to Stimulated Raman Scattering (SRS) and power transients due to uncontrolled spectral changes.

C+L optical line systems may be susceptible to experiencing optical power transients during loading operations due to the Stimulated Raman Scattering (SRS) effect across the different frequency bands due to the under-filled optical spectra. This can lead to traffic drop on pre-existing services in one frequency band if there is a significant loading change in the other frequency band.

SUMMARY

In C+L-band networks, services in a particular band (i.e., the C-band or the L-band) should be carefully loaded to minimize the effects of optical power changes on pre-existing services in the other band. Additionally, the optical signal may be shaped during transmission due to fiber transmission characteristics and/or non-ideal network elements such as frequency dependent fiber losses, the fiber attenuation profile, amplifier gain ripple, WDM filter ripple, and/or stimulated Raman scattering SRS, and the like, for example.

Traditionally, subsea optical line systems use amplified spontaneous emission (ASE) idlers to maintain a constant input power into the wet plant, since the in-line amplifiers between the headend node and the tailend node use a constant output power control methodology. Maintaining a constant input power/spectrum profile at the SLTE input maintains a constant power profile through the link. Changes to the input spectra of the optical signal leads to errors in the gain/tilt applied at each amplifier site and degrades the overall link performance. Further, subsea optical line systems comprising a single path from the headend node to the tailend node do not have the complexity of modern terrestrial optical networks, which further amplify the errors in the gain/tilt approach of subsea optical line systems, making such approaches unsuited for terrestrial optical networks.

Thus, a need exists for a fast and scalable approach to utilize ASE idlers to quickly restabilize a system after a failure event leads to an uncontrolled loss of power in the network. The system detects the failure, and quickly ramps shaped ASE passband(s) to a precomputed target profile, matching the average power of the failed optical signal(s). This restabilizes the SRS dynamics and returns the systems to a last-known-good operating condition.

The network element comprises an ASE source, a first wavelength selective switch (WSS), a second WSS, a spectrally-resolved measurement device, and a controller. The amplified spontaneous emission (ASE) source is configured to generate ASE noise. The first WSS is operable to receive a first optical signal from an upstream network element where the first optical signal comprises a plurality of first user signal passbands having an expected optical power. The second WSS is operable to receive the first optical signal, to attenuate the ASE noise into an ASE passband, and to selectively multiplex the first optical signal and the ASE passband into a second optical signal having a plurality of second passbands. The spectrally-resolved measurement device is operable to detect an optical power of at least one of the first optical signal and the second optical signal. The controller comprises a processor and a memory. The memory comprises a non-transitory processor-readable medium storing processor-executable instructions that cause the processor to: receive a power signal from the spectrally-resolved measurement device indicative of the optical power of the first optical signal; detect a passband failure within one or more of the first optical signal and the second optical signal based at least in part on the power signal, the passband failure associated with a failed passband being one of the plurality of first user signal passbands; generate the ASE passband; cause the second WSS to multiplex the ASE passband into the second optical signal; and cause the second WSS to activate the ASE passband to replace the failed passband.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1A:
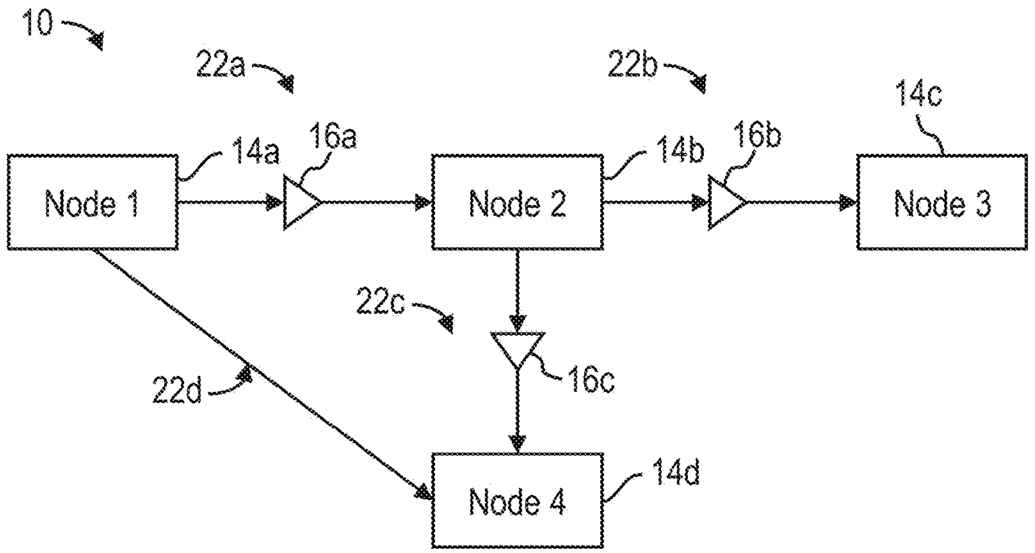
FIG. 1A is a diagram of an exemplary implementation of an optical transport network constructed in accordance with the present disclosure.

The following detailed description of exemplary embodiments/implementations refers to the accompanying drawings. The same reference numbers in different drawings may identify the same or similar elements.

Before explaining at least one implementation of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other implementations or of being practiced or carried out in various ways. Also, it is to be understood that the phraseology and terminology employed herein are for purposes of description and should not be regarded as limiting.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of the embodiments/implementations herein. This is done merely for convenience and to give a general sense of the inventive concept. This description should be read to include one or more and the singular also includes the plural unless it is obvious that it is meant otherwise. Further, use of the term “plurality” is meant to convey “more than one” unless expressly stated to the contrary.

As used herein, qualifiers like “about,” “approximately,” and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory processor-readable mediums, such as a memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHZ, 3.125 GHz, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A Wavelength Selective Switch is a programmable device having source and destination fiber ports where the source and destination fiber ports and associated attenuation can be specified for a particular passband with a minimum bandwidth. The minimum bandwidth may be, for example, a slice. In one implementation, for example, the wavelength selective switch is operable to apply an attenuation for a particular passband having a first bandwidth and the optical power monitoring device has a resolution of a second bandwidth. The first bandwidth and the second bandwidth may be different (for example, the first bandwidth may be 12.5 GHZ and the second bandwidth may be 3.125 GHZ). In this implementation, then, the WSS may have a different slice width than the optical power monitor slice width.

A reconfigurable optical add-drop multiplexer (ROADM) node is an all-optical subsystem that enables remote configuration of wavelengths at any ROADM node, in other words, a ROADM enables optical switching of an optical signal without requiring conversion of the optical signal from an optical domain into an electrical or digital domain. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS), Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

As used herein, a transmission line segment (which may be referred to as an optical link or an optical multiplex section) is the portion of a transmission line from a first node (e.g., a first ROADM) transmitting a transmission signal to a second node (e.g., a second ROADM) receiving the transmission signal. The transmission line segment may include one or more optical in-line amplifier situated between the first node and the second node. In some implementations, an optical multiplex section (OMS) has the same scope as the transmission line segment (TLS). In some implementations, the OMS may be a subset of a TLS. In some implementations, OMS-C(C-Band) and OMS-L (L-Band) are combined together in an optical link or TLS. In some implementations, TLS may be used synonymously with Optical Link. An Optical Link may be composed of OMSs including OMS-C and OMS-L.

Referring now to the drawings, and in particular to FIG. 1A, shown therein is a diagram of an exemplary implementation of an optical transport network 10 constructed in accordance with the present disclosure. The optical transport network 10 is depicted as having a plurality of network elements 14*a-n*, including a first network element 14*a*, a second network element 14*b*, a third network element 14*c*, and a fourth network element 14*d*. Though four network elements 14 are shown for the purposes of illustration, it will be understood that the plurality of network elements 14*a-n* may comprise more or fewer network elements 14.

Data transmitted within the optical transport network 10 may be transmitted along optical paths formed by one or more transmission line segments 22, such as a first transmission line segment 22*a*, a second transmission line segment 22*b*, and a third transmission line segment 22*c*. For instance, data transmitted from the first network element 14*a* to the second network element 14*b* may travel along the optical path formed from the first transmission line segment 22*a*.

In some implementations, more than one optical path may connect any two network elements 14 such that the optical transport network 10 may be considered a mesh network. For example, a fourth transmission line segment 22*d* may connect the first network element 14*a* and the fourth network element 14*d*. In this way, data may be transmitted between the first network element 14*a* and the fourth network element 14*d* via one or more of: the fourth transmission line segment 22*d* and a combination of the first transmission line segment 22*a*, the second network element 14*b*, and the third transmission line segment 22*c*.

The optical transport network 10 may be provided with one or more optical in-line amplifiers (ILA) disposed in the transmission line segments 22*a*, 22*b*, and 22*c* such as a first ILA 16*a*, a second ILA 16*b*, and a third ILA 16*c* disposed in the transmission line segments 22*a*, 22*b*, and 22*c*, respectively.

The optical transport network 10 may be, for example, made up of interconnected individual nodes (that is, the network elements 14). The optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1A is provided for explanatory purposes. In practice, there may be additional devices and/or networks, fewer devices and/or networks, different devices, and/or networks, or differently arranged devices and/or networks than are shown in FIG. 1A. Furthermore, two or more of the devices illustrated in FIG. 1A may be implemented within a single device, or a single device illustrated in FIG. 1A may be implemented as multiple, distributed devices. Additionally, or alternatively, one or more of the devices of the optical transport network 10 may perform one or more functions described as being performed by another one or more of the devices of the optical transport network 10.

Figure 1B:
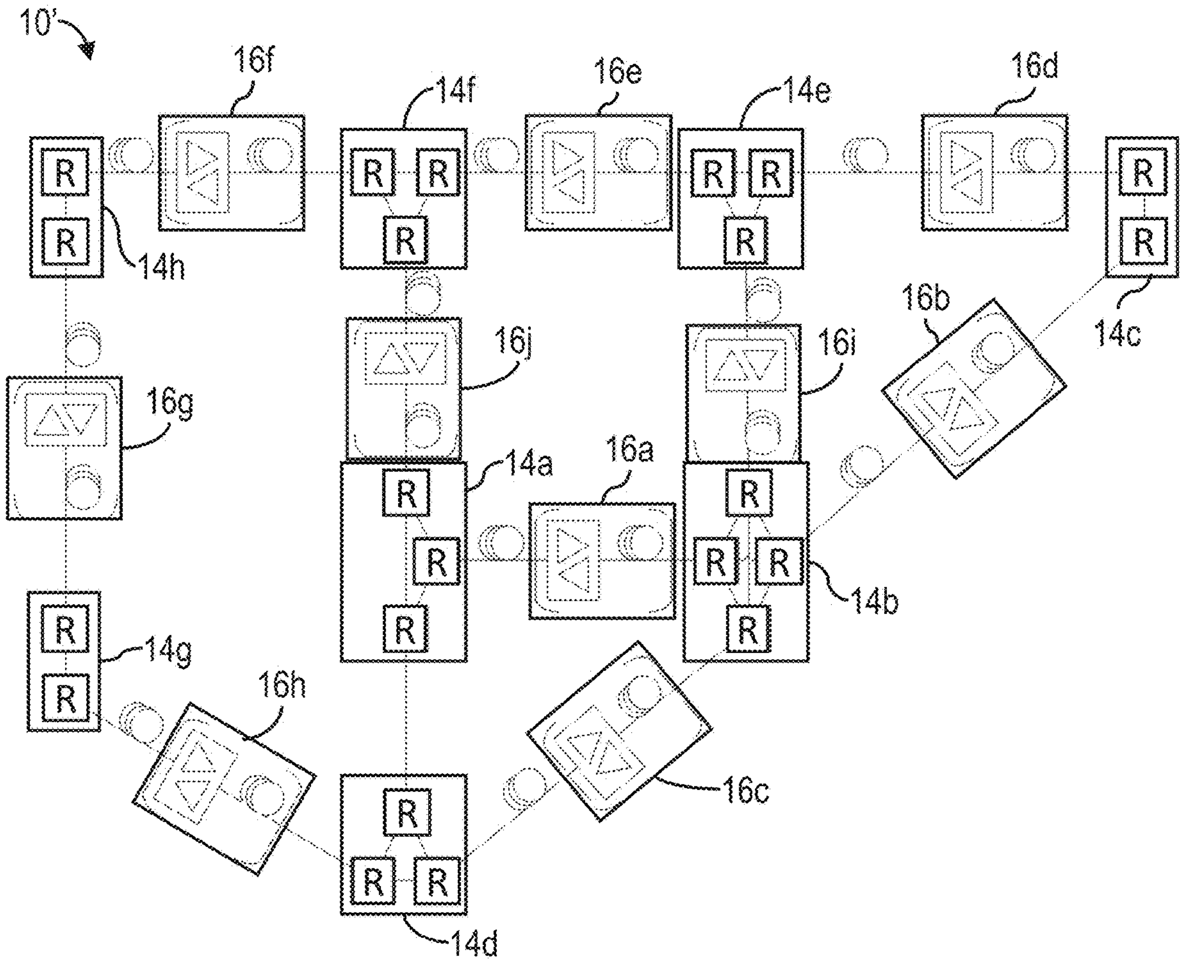
FIG. 1B is a diagram of another exemplary implementation of an optical transport network constructed in accordance with the present disclosure.

Referring now to FIG. 1B, shown therein is a diagram of another exemplary implementation of an optical transport network 10' constructed in accordance with the present disclosure. The optical transport network 10' may be constructed in accordance with the optical transport network 10 of FIG. 1A with additional ones of the network elements 14 and additional ones of the ILAs 16. For example, as shown, the optical transport network 10' is depicted as having additional network elements 14*e-h* and additional ILAs 16*d-j*. Further, as shown in FIG. 1B, each network element 14 is depicted has having one or more flexible ROADM module, or ROADM, as indicated by the reference character 'R', described in more detail below in reference to ROADM 110 shown in FIG. 2A.

Figure 2A:
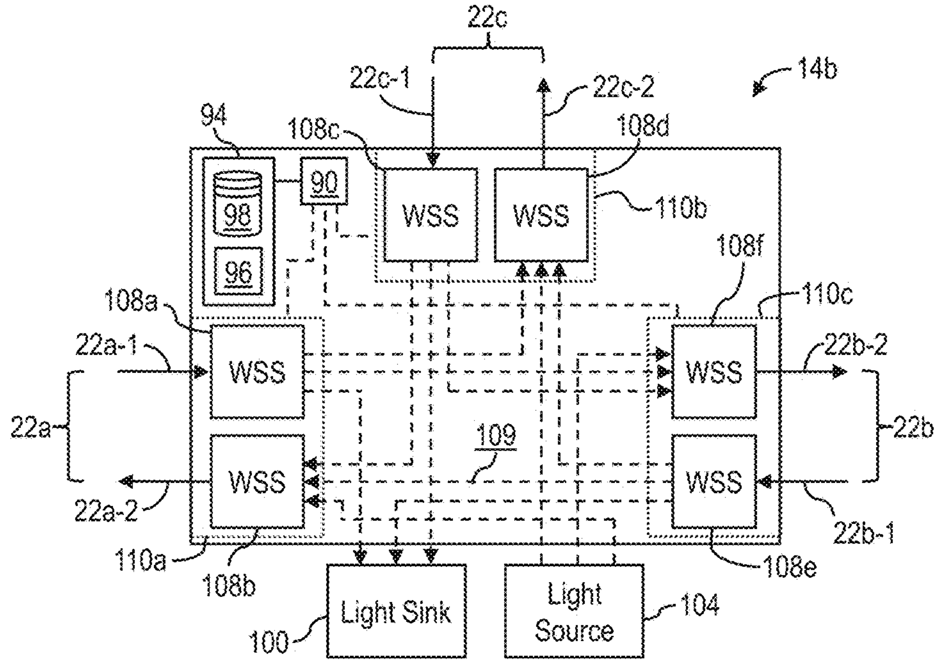
FIG. 2A is a block diagram of an exemplary implementation of the second network element of FIG. 1A, constructed in accordance with the present disclosure.

Referring now to FIG. 2A, shown therein is a block diagram of an exemplary implementation of the second network element 14*b* constructed in accordance with the present disclosure. In general, the second network element 14*b* transmits and receives data traffic and control signals. Nonexclusive examples of alternative implementations of the second network element 14*b* include optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links. OLTs may be used at either end of a connection or optical fiber link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety. As used herein, the network element 14 is implemented as a ROADM unless specifically stated otherwise.

For the purposes of illustration, and not limitation, the second network element 14*b* will be described as an exemplary network element 14. It should be understood, however, that each network element 14 may be comprised of the same elements. In FIG. 2A, the second network element 14*b* is illustrated as being a ROADM having three degrees that interconnect the first transmission line segment 22*a*, the second transmission line segment 22*b*, and the third transmission line segment 22*c*. Each of the first transmission line segment 22*a*, the second transmission line segment 22*b*, and the third transmission line segment 22*c* may include optical fiber pairs, wherein each fiber of the pair carries optical signal groups propagating in opposite directions. As seen in FIG. 2A, for example, the first transmission line segment 22*a* includes a first optical fiber 22*a*-1, which carries optical signals toward the second network element 14*b* and a second optical fiber 22*a*-2 that carries optical signals out from the second network element 14*b*. Similarly, the second transmission line segment 22*b* may include a first optical fiber 22*b*-1 and a second optical fiber 22*b*-2 carrying optical signal groups to and from the second network element 14*b*, respectively. Further, the third transmission line segment 22*c* may include a first optical fiber 22*c*-1 and a second optical fiber 22*c*-2 also carrying optical signals to and from the second network element 14*b*, respectively. Additional nodes, not shown in FIG. 2A, may be provided that supply optical signal groups to and receive optical signal groups from the second network element 14*b*. Such additional nodes may also have a ROADM having the same or similar structure as that of the second network element 14*b*.

As further shown in FIG. 2A, a light sink 100 (described below in more detail and shown in FIG. 2B) and a light source 104 (described below in more detail and shown in FIG. 2C) may be provided in communication with the second network element 14*b* to drop and add optical signal groups, respectively.

As shown in FIG. 2A, the second network element 14*b* may include a plurality of wavelength selective switches (WSSs 108), such as a first wavelength selective switch 108*a* (hereinafter "first WSS 108*a*"), a second wavelength selective switch 108*b* (hereinafter "second WSS 108*b*"), a third wavelength selective switch 108*c* (hereinafter "third WSS 108*c*"), a fourth wavelength selective switch 108*d* (hereinafter "fourth WSS 108*d*"), a fifth wavelength selective switch 108*e* (hereinafter "fifth WSS 108*e*"), and a sixth wavelength selective switch 108*f* (hereinafter "sixth WSS 108*f*"). Wavelength selective switches are components that can dynamically route, block, and/or attenuate received optical signal groups input from and output to transmission line segments 22*a-n*. In addition to transmitting/receiving optical signal groups from network elements 14, optical signal groups may also be input from or output to the light source 104 and light sink 100, respectively.

In one implementation, the WSSs 108 for a particular degree, along with associated ROADM memory 188 and ROADM processor 186 (shown in FIG. 2D), may be collectively referred to as a flexible ROADM module, or ROADM 110. For example, as shown in FIG. 2A, the first WSS 108*a* and the second WSS 108*b* may be part of a first ROADM 110*a*, the third WSS 108*c* and the fourth WSS 108*d* may be part of a second ROADM 110*b*, and the fifth WSS 108*e* and the sixth WSS 108*f* may be part of a third ROADM 110*c*.

In one implementation, each WSS 108*a-f* may include a reconfigurable optical filter (not shown) operable to allow a passband (e.g., particular bandwidth of the spectrum of the optical signal) to pass through or be directly routed as herein described.

As further shown in FIG. 2A, each of the WSS 108*a-f* may be configured to receive optical signal groups (e.g., optical passbands) and may be operable to selectively switch, or direct, such optical signal groups to other WSSs for output from the second network element 14*b*. For example, the first WSS 108*a* may receive optical signal groups on the first optical fiber 22*a*-1 and supply certain optical signal groups to the sixth WSS 108*f*, while other optical signal groups are supplied to a fourth WSS 108*d*. Optical signal groups supplied to the sixth WSS 108*f* may be output to a downstream network element 14, such as the third network element 14*c* (FIG. 1) on the second optical fiber 22*b*-2, while optical signal groups supplied to the fourth WSS 108*d* may be output to the fourth network element 14*d* on second optical fiber 22*c*-2. Optical signal groups input to the second network element 14*b* on the first optical fiber 22*b*-1 may be supplied by the fifth WSS 108*e* to either the second WSS 108*b* and on to the first network element 14*a* via the second optical fiber 22*a*-2 or the fourth WSS 108*d* and on to the fourth network element 14*d* via the second optical fiber 22*c*-2. Moreover, the third WSS 108*c* may selectively direct optical signal groups (e.g., selectively switch optical passband groups) input to the second network element 14*b* from the first optical fiber 22*c*-1 to either the second WSS 108*b* and onto the first network element 14*a* via the second optical fiber 22*a*-2 or to the sixth WSS 108*f* and onto the second network element 14*b* via the second optical fiber 22*b*-2.

The first WSS 108*a*, the third WSS 108*c*, and the fifth WSS 108*e* may also selectively or controllably supply optical signal groups to the light sink 100. Optical signal groups output from the light source 104 may be selectively supplied to one or more of the second WSS 108*b*, the fourth WSS 108*d*, and the sixth WSS 108*f*, for output on to the second optical fiber 22*a*-2 of the first transmission line segment 22*a*, the second optical fiber 22*b*-2 of the second transmission line segment 22*b*, and the second optical fiber 22*c*-2 of the third transmission line segment 22*c*, respectively.

In one implementation, the second network element 14*b* may further comprise a node processor 90 and a non-transitory processor-readable medium referred to herein as node memory 94. The node processor 90 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The node processor 90 is in communication with the node memory 94 and may be operable to read and/or write to the node memory 94. The node processor 90 is illustrated in communication with the first ROADM 110*a*, the second ROADM 110*b*, and the third ROADM 110*c*, however, it should be noted that in some implementations, the node processor 90 may be in communication with each of the WSS 108. The node processor 90 may be further capable of interfacing and/or communicating with other network elements 14 (e.g., the first network element 14*a*, the third network element 14*c*, and the fourth network element 14*d*) via, for example, an optical control channel (e.g., sometimes referred to herein as an optical supervisory channel or an "OSC").

In one implementation, the node memory 94 of the network element 14, such as of the second network element 14*b*, may store processor-executable instructions, such as a software 96, that when executed by the node processor 90, causes the node processor 90 to perform an action, for example, communicate with or control one or more component of the network element 14 such as control one or more of the WSS 108 and the ROADM 110.

In one implementation, the node memory 94 may store one or more of the datastore 98. The datastore 98 may include, for example, structured data from relational databases, semi-structured data, unstructured data, time-series data, binary data, and the like and/or some combination thereof. The datastore 98 may be a data base, a remote accessible storage, or a distributed filesystem. In some implementations, the datastore 98 may be a component of an enterprise network.

Figure 2B:
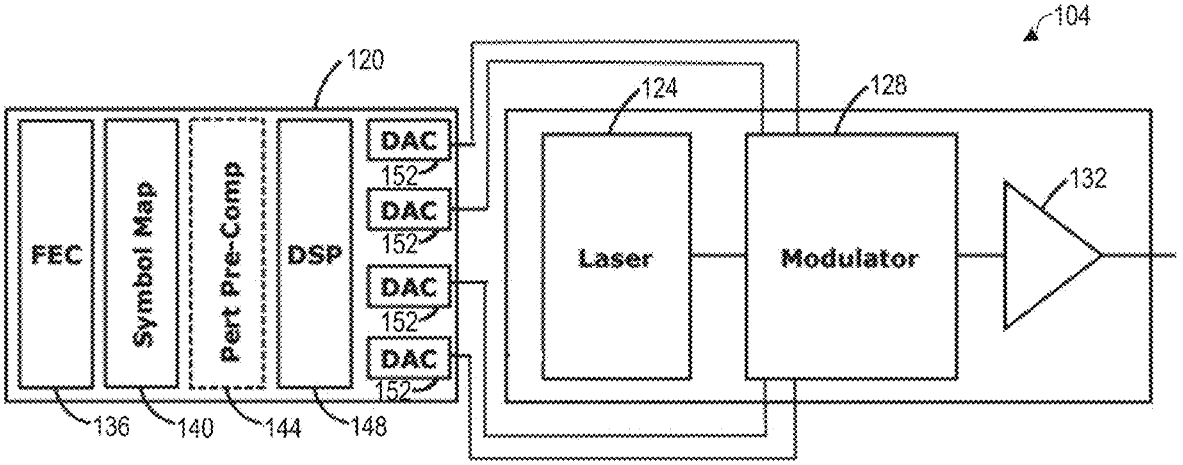
FIG. 2B is a diagram of an exemplary implementation of the light source of FIG. 2A constructed in accordance with the present disclosure.

Referring now to FIG. 2B, shown therein is a diagram of an exemplary implementation of the light source 104 of FIG. 2A constructed in accordance with the present disclosure. The light source 104 may comprise one or more transmitter processor circuit 120, one or more laser 124, one or more modulator 128, one or more semiconductor optical amplifier 132, and/or other components (not shown).

The transmitter processor circuit 120 may have a Transmitter Forward Error Correction (FEC) circuitry 136, a Symbol Map circuitry 140, a transmitter perturbative pre-compensation circuitry 144, one or more transmitter digital signal processor (DSP) 148, and one or more digital-to-analogue converters (DAC) 152. The transmitter processor circuit 120 may be located in any one or more components of the light source 104, or separate from the components, and/or in any location(s) among the components. The transmitter processor circuit 120 may be in the form of one or more Application Specific Integrated Circuit (ASIC), which may contain one or more module and/or custom module.

Processed electrical outputs from the transmitter processor circuit 120 may be supplied to the modulator 128 for encoding data into optical signals generated and supplied to the modulator 128 from the laser 124. The semiconductor optical amplifier 132 receives, amplifies, and transmits the optical signal including encoded data in the spectrum. Processed electrical outputs from the transmitter processor circuit 120 may be supplied to other circuitry in the transmitter processor circuit 120, for example, clock and data modification circuitry. The laser 124, modulator 128, and/or semiconductor optical amplifier 132 may be coupled with a tuning element (e.g., a heater) (not shown) that can be used to tune the wavelength of an optical signal channel output by the laser 124, modulator 128, or semiconductor optical amplifier 132. In some implementations, a single one of the laser 124 may be shared by multiple light source 104.

Other possible components in the light source 104 may include filters, circuit blocks, memory, such as non-transitory memory storing processor-executable instructions, additional modulators, splitters, couplers, multiplexers, etc., as is well known in the art. The components may be combined, used, or not used, in multiple combinations or orders. Optical transmitters are further described in U.S. Pat. No. 8,768,177, titled "WAVELENGTH DIVISION MULTIPLEXED OPTICAL COMMUNICATION SYSTEM HAVING VARIABLE CHANNEL SPACINGS", the entire content of which is hereby incorporated by reference in its entirety herein.

Figure 2C:
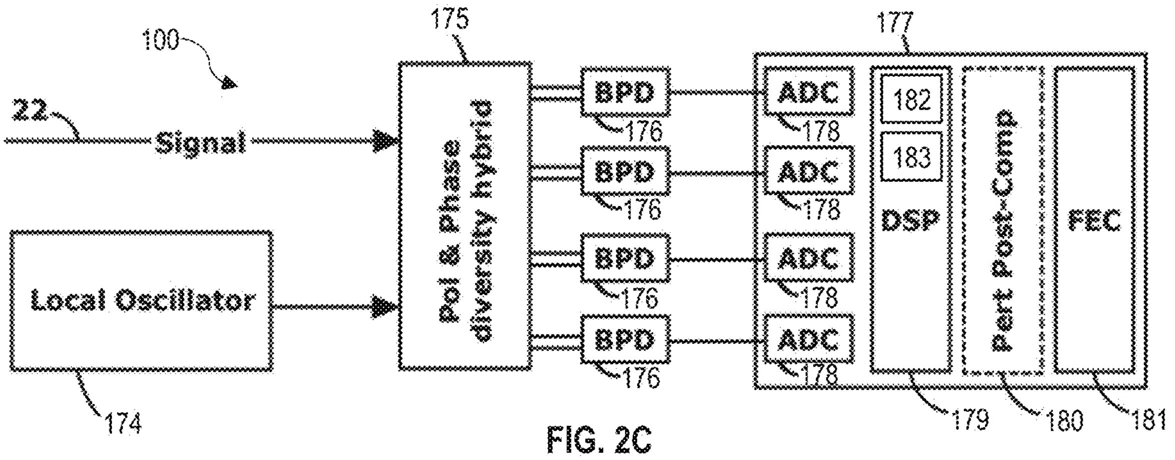
FIG. 2C is a block diagram of an exemplary implementation of the light sink of FIG. 2A constructed in accordance with the present disclosure.

Referring now to FIG. 2C, shown therein is a block diagram of an exemplary implementation of the light sink 100 constructed in accordance with the present disclosure. The light sink 100 may comprise one or more local oscillator 174, a polarization and phase diversity hybrid circuit 175 receiving the one or more channel from the optical signal and the input from the local oscillator 174, one or more balanced photodiode (BPD) 176 that produces electrical signals representative of the one or more channel on the spectrum, and one or more receiver processor circuit 177. Other possible components in the light sink 100 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The light sink 100 may be implemented in other ways, as is well known in the art. Exemplary implementations of the light sink 100 are further described in U.S. Pat. No. 8,014,686, titled "POLARIZATION DEMULTIPLEXING OPTICAL RECEIVER USING POLARIZATION OVERSAMPLING AND ELECTRONIC POLARIZATION TRACKING", the entire content of which is hereby incorporated by reference in its entirety herein.

The one or more receiver processor circuit 177, may comprise one or more analog-to-digital converter (ADC) 178 receiving electrical signals from the one or more balanced photodiodes 176, one or more receiver digital signal processor (hereinafter, receiver DSP 179), receiver perturbative post-compensation circuitry 180, and receiver forward error correction circuitry (hereinafter, receiver FEC circuitry 181). The receiver FEC circuitry 181 may apply corrections to the data, as is known in the art. The one or more receiver processor circuit 177 and/or the one or more receiver DSP 179 may be located on one or more component of the light sink 100 or separately from the components, and/or in any location(s) among the components. The receiver processor circuit 177 may be in the form of an Application Specific Integrated Circuit (ASIC), which may contain one or more module and/or custom module. In one implementation, the receiver DSP 179 may include, or be in communication with, one or more processor 182 and one or more memory 183 storing processor readable instructions, such as software, or may be in communication with the node processor 90 and the node memory 94.

The one or more receiver DSP 179 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 179 may be supplied to other circuitry in the receiver processor circuit 177, such as the receiver perturbative post-compensation circuitry 180 and the receiver FEC circuitry 181.

Various components of the light sink 100 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical non-linear effects between the light source 104 and the light sink 100 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 171 and the receiver perturbative post-compensation circuitry 180. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler", herein incorporated by reference in its entirety, by use of analysis of one or more incoming channel at the light sink 100.

Figure 2D:
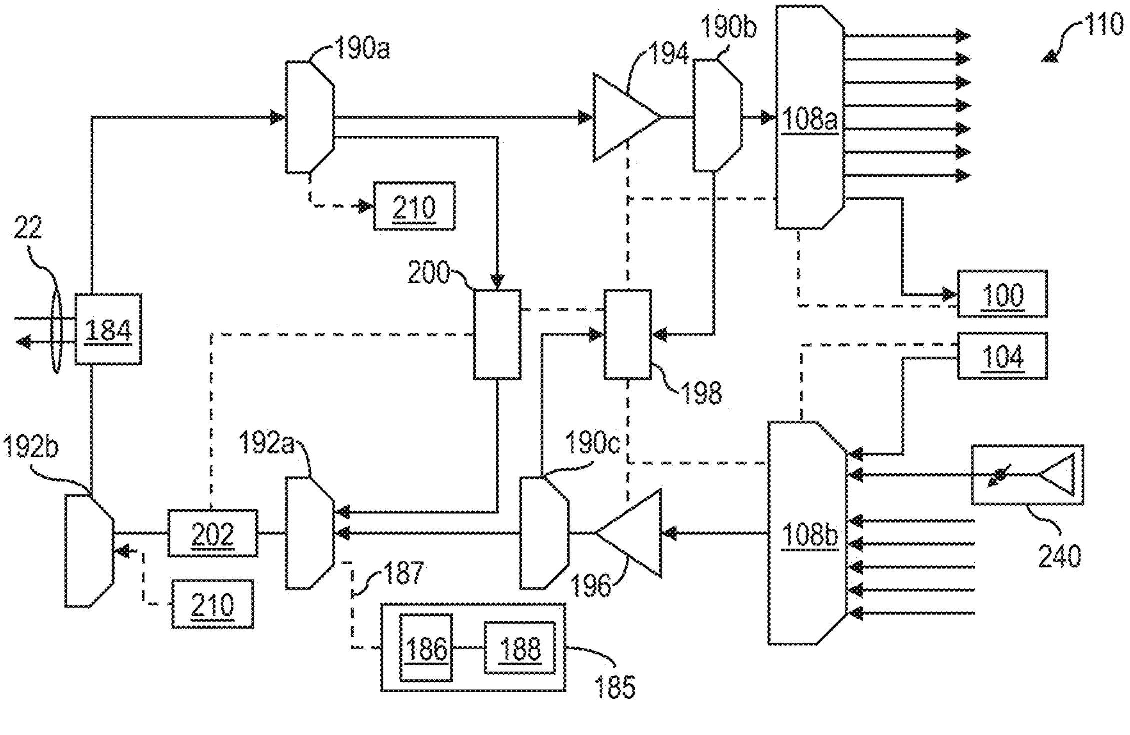
FIG. 2D is a diagrammatic view of an exemplary one of the ROADM of FIG. 2A constructed in accordance with the present disclosure.

Referring now to FIG. 2D, shown therein is a diagrammatic view of an exemplary one of the ROADM 110 constructed in accordance with the present disclosure. In general, the ROADM 110 transmits and receives data traffic and control signals. As shown in FIG. 2D, the ROADM 110 is a flexible ROADM module that connects to the transmission line segment 22 via a line port 184. As detailed above, the transmission line segment 22 may include optical fiber pairs, wherein each fiber of the pair carries optical signal groups propagating in opposite directions. For the purposes of illustration, and not limitation, the ROADM 110 will be described as an exemplary ROADM 110. It should be understood, however, that the first ROADM 110*a*, the second ROADM 110*b*, and the third ROADM 110*c* may be constructed in accordance with the ROADM 110 describe herein and may be comprised of the same elements.

In one implementation, the ROADM 110 may be provided with a controller 185 having circuitry including a ROADM processor 186 and a ROADM memory 188. The ROADM memory 188 may be a non-transitory processor-readable medium storing processor-executable instructions that when executed by the ROADM processor 186 cause the ROADM processor 186 to perform one or more function or process, as described below.

In one implementation, the ROADM 110 may further be provided with an input optical splitter 190, an output optical combiner 192, an input optical amplifier 194, an output optical amplifier 196, the first WSS 108*a*, the second WSS 108*b*, a spectrally-resolved measurement device 198, and an optical supervisory channel (OSC) 200. In one implementation, at least one light sink 100 and at least one light source 104 may be provided and in communication with the ROADM 110 to drop and add optical signals, respectively.

It should be noted that the elements of the ROADM 110 are shown for illustration purposes only and should not be considered limiting. The ROADM 110 may be implemented with a launch power for each transmission line segment 22 serviced by the controller 185 of the ROADM 110 implemented in accordance with the inventive concepts described herein. Further, the light source 104 and the light sink 100 may be implemented as a line card having multiple add and drop transceivers and may be configured to service channels across multiple ROADM degrees.

The spectrally-resolved measurement device 198 provides the ability to monitor a power level at one or more sample frequency of the optical signal with a sample resolution. The sample resolution may be, for example, between 12.5 GHZ and 0.3125 GHz. In other implementations, the sample resolution may be less than 0.3125 GHZ, for example, 0.15625 GHz or 78.125 MHz. For example, if the spectrally-resolved measurement device 198 has a sample resolution of 12.5 GHz and the optical signal has a signal bandwidth of 125 GHZ, the spectrally-resolved measurement device 198 may slice the signal bandwidth into 10 spectral slices of 12.5 GHz where each spectral slice is centered on a particular sample frequency. The spectrally-resolved measurement device 198 may thus determine the power level of each spectral slice for the optical signal based on the sample frequency for each spectral slice. In one implementation, as the spectrally-resolved measurement device 198 determines a power level for a particular sample frequency, the power level/sample frequency pair is stored, for example, in the ROADM memory 188 by the ROADM processor 186. In one implementation, the spectrally-resolved measurement device 198 may measure one or more optical characteristics of an optical signal, such as, for example, a power spectral density, a center frequency, an optical bandwidth, a shape, a channel slope, a channel roll-off, and/or the like or some combination thereof. In this way, the spectrally-resolved measurement device 198 is operable to sample an optical power of one or more spectral slice. The spectrally-resolved measurement device 198 can be implemented as an optical power monitor, the construction and use of which is known in the art.

This slice-wise power level data can then be used by the controller 185, e.g., processed by the ROADM processor 186 of the controller 185, to determine a sample power profile of the optical signal. The sample power profile, then, may be a set of sample frequency/power level pairs for each spectral slice. In one implementation, the sample power profile may be a power profile of a selected subset of spectral slices of the optical signal.

In one implementation, the ROADM processor 186 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The ROADM processor 186 is in communication with the ROADM memory 188 and may be operable to read and/or write to the ROADM memory 188.

In one implementation, the spectrally-resolved measurement device 198 can also be used to troubleshoot the optical transport network 10, such as optical channel monitors (OCMs) and higher-resolution coherent OCMs. Coherent OCMs offer sub-GHz frequency accuracy and highly accurate power monitoring of fine spectral slices independent of adjacent channel power. Coherent OCMs reduce the C-band scanning time from seconds to hundreds of milliseconds and provide advanced processing of spectral characteristics, such as valid channel detection, center wavelength, and optical signal-to-noise ratio (OSNR).

In one implementation, the OSC 200 provides a communication channel between adjacent nodes, such as the first network element 14*a* and the second network element 14*b*, that can be used for functions including link control, in-band management, control plane (i.e., ASON/GMPLS), and span loss measurement. Static information about physical properties of the transmission line segment 22 (fiber types, loss, amplifier types, etc.) downstream from the network element 14 can be communicated to the controller 185 via the OSC 200.

As shown in FIG. 2D, the ROADM 110 may include the controller 185 for controlling components of the ROADM 110. The ROADM 110 may be provided with an interface 187 that connects the controller 185 to the components of the ROADM 110.

The ROADM 110 may include one or more wavelength selective switch, shown as the second WSS 108*b* (as a mux WSS) and the first WSS 108*a* (as a demux WSS). As described above, wavelength selective switches are components that can dynamically route, block and/or attenuate received optical signals input from and output to optical fiber links 22*a-n*. In addition to transmitting and/or receiving optical signals from the ROADM 110, optical signals may also be input from or output to the light source 104 or an amplified spontaneous emission (ASE) idler, e.g., ASE idler 240, and the light sink 100, respectively.

In one implementation, each WSS 108 may be a reconfigurable, optical filter operable to allow one or more passbands (e.g., particular bandwidth(s) of the spectrum of the optical signal) to pass through or be routed as herein described.

In one implementation, the first WSS 108*a* may be a DEMUX WSS, e.g., can receive optical signals and may be operable to selectively switch, or direct, such optical signals to one or more other WSS for output from the ROADM 110. The first WSS 108*a* (e.g., a demux WSS) may also selectively or controllably supply optical signals to the light sink 100. The second WSS 108*b* may be a MUX WSS, e.g., operable to selectively receive optical signals from the light source 104 and from one or more express path. The optical signals output from the light source 104, the ASE idler 240, and/or from the express path may be selectively supplied to the second WSS 108*b* for output to the first transmission line segment 22*a*.

In one implementation, the second WSS 108*b* may apply attenuations and filtering to ASE noise received from the ASE idler 240 into an ASE passband before multiplexing the ASE passband onto the optical signal.

In one implementation, the input optical amplifier 194 and/or the output optical amplifier 196 may be any optical amplifier configured to increase or supplement an optical power of the optical signal. For example, one or more of the input optical amplifier 194 and the output optical amplifier 196 may be an Erbium doped fiber amplifier (EDFA). In one implementation, one or more of the input optical amplifier 194 and the output optical amplifier 196 may further include a variable optical attenuator.

In one implementation, the ROADM 110 further includes an output variable optical attenuator 202 (e.g., VOA 202). The VOA 202 is an optical device operable to control attenuation (or insertion loss) according to an electrical control signal (e.g., received from the ROADM processor 186 of the controller 185 (described below)). The insertion loss may be, for example, a calibrated known value.

As shown in FIG. 2D, a first optical signal enters the ROADM 110 via the first transmission line segment 22*a* and passes through the first optical splitter 190*a* where a control channel may be directed to the OSC 200 and the first optical signal enters the input optical amplifier 194 before being split at a second input optical splitter 190*b* where a sample portion of the first optical signal is directed to the spectrally-resolved measurement device 198 while a remainder of the first optical signal continues to the first WSS 108*a* (e.g., a demux WSS). Further, a plurality of optical signals and ASE noise may be received by the second WSS 108*b* which outputs a third optical signal which is amplified by the output optical amplifier 196 before passing through a third optical splitter 190*c* where a sample portion of the third optical signal is directed to the spectrally-resolved measurement device 198 while a remainder of the third optical signal continues to the output optical combiner 192*a* which inserts a downstream control signal from the OSC 200 into the third optical signal. The third optical signal continues through the VOA 202, to the line port 184 and the first transmission line segment 22*a*.

In some implementations, when the ROADM 110 is a C-band ROADM, when the first optical signal enters the first optical splitter 190*a*, the first optical signal is split into a C-band portion that continues within the ROADM 110, and an L-band portion that is directed to an L-band ROADM 210. The L-band ROADM 210 may be constructed similar to the ROADM 110 with the exception that the L-band ROADM 210 may omit the OSC 200 and, in some implementations, the L-band ROADM 210 may be in communication with, and controlled by, the controller 185.

In some implementations, the third optical signal may further pass into a second optical combiner 192*b* operable to combine the third optical signal with an L-band optical signal received from the L-band ROADM 210.

As shown in FIG. 2D, the spectrally-resolved measurement device 198 and the OSC 200 are shared for both directions of the first transmission line segment 22*a*. In other implementations, however, each direction may have a dedicated OSC 200 and/or a dedicated spectrally-resolved measurement device 198.

In one implementation, the ASE idler 240 may be optically coupled to each ROADM 110. As shown in FIG. 2D, the ASE idler 240 is optically coupled to the second WSS 108*b* (e.g., a mux WSS) of the ROADM 110. The ASE idler 240 may be constructed to generate broad-spectrum light by spontaneous emission (i.e., ASE noise) in an optical amplifier in the C-band, the L-band, and/or the C+L band. For example, the ASE idler 240 constructed as a C-band ASE idler may be in communication with a C-band ROADM (described above) while the ASE idler 240 constructed as an L-band idler may be in communication with an L-band ROADM (described above). In some implementations, the ASE idler 240 is constructed as part of the ROADM 110, such that each ROADM 110 includes the ASE idler 240. In other implementations, the ASE idler 240 is constructed separately from the ROADM 110 and may be shared between multiples of the ROADMs 110.

The number of devices illustrated in FIG. 2D are provided for explanatory purposes. In practice, there may be additional devices, fewer devices, different devices, or differently arranged devices than are shown in FIG. 2D. Furthermore, two or more of the devices illustrated in FIG. 2D may be implemented within a single device, or a single device illustrated in FIG. 2D may be implemented as multiple, distributed devices. Additionally, one or more of the devices illustrated in FIG. 2D may perform one or more function described as being performed by another one or more of the devices illustrated in FIG. 2D.

Figure 2E:
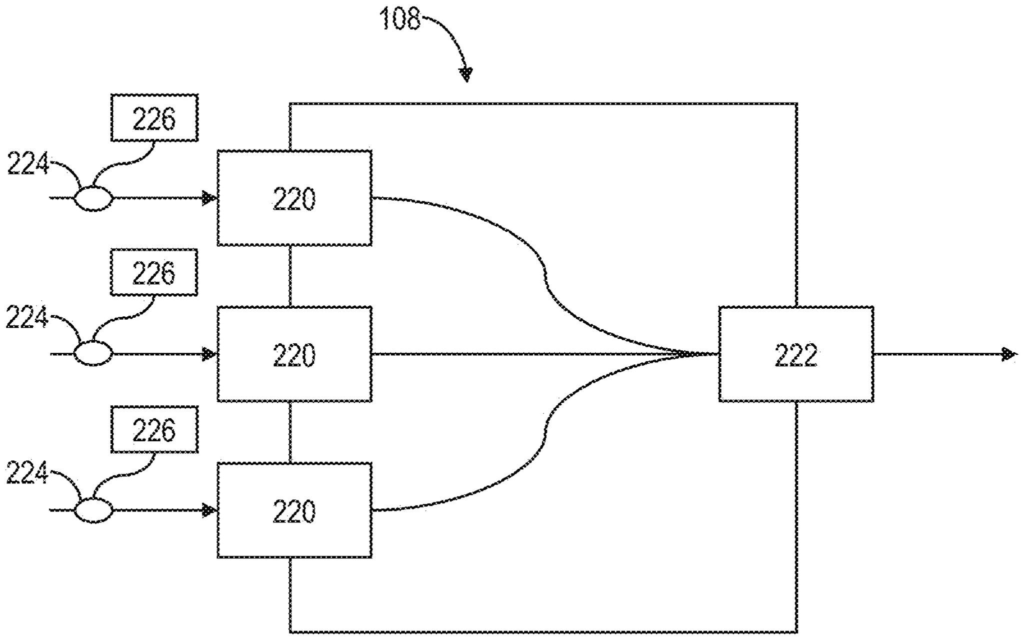
FIG. 2E is a diagram of the WSS shown in FIG. 2A constructed in accordance with the present disclosure.

Referring now to FIG. 2E, shown therein is a diagram of an exemplary embodiment of the WSS 108 of FIG. 2A, constructed in accordance with the present disclosure. The WSS 108 may comprise a plurality of tributary ports 220 and a line port 222. Although three tributary ports 220 and one line port 222 are shown in FIG. 2E, persons having ordinary skill in the art will understand that the WSS 108 may have other numbers of tributary ports 220 and line ports 222. The WSS 108 may be operable to receive a plurality of passbands at the tributary ports 220 of the WSS 108, multiplex the passbands, and transmit the passbands at the line port 222 of the WSS 108. The WSS 108 in this configuration (i.e., where the tributary ports 220 are inputs and the line port 222 is an output) may be referred to as a multiplexer (MUX) WSS (e.g., shown as second WSS 108*b* in FIG. 2D). The WSS 108 also may be operable to receive a plurality of passbands at the line port 222, de-multiplex the passbands, and transmit the passbands at the tributary ports 220. The WSS 108 in this configuration (i.e., where the line port 222 is an input and the tributary ports 220 are outputs) may be referred to as a de-multiplexer (DEMUX) WSS (e.g., shown as first WSS 108*a* in FIG. 2D). In some implementations, each WSS 108 is further operable to apply a frequency-dependent variable attenuation for each of the passbands so that power levels may be changed at the outgoing port (i.e., the line port 222 for the MUX modules and the tributary ports 220 for the DEMUX modules) for the passbands, such as the user signal passbands and/or the ASE passbands. The WSS 108 may apply an attenuation on a per-passband basis, that is, a uniform attenuation across the passband. Additionally, the WSS 108 can apply an attenuation on a per-slice basis, that is, each spectral slice within the optical spectrum of the optical signal may have a different (or same) attenuation applied thereto. In this way, each passband may have an attenuation profile comprising attenuation settings indicative of an attenuation for one or more spectral slices of the passband.

In some implementations, each of the WSS 108 also may be operable to control the attenuation for each of the passbands. Such variable power adjustable functionality may be advantageous to permit flexibility in adapting to changes in the optical characteristics of the optical transport network 10 such as due to the passband failure.

Generally, each MUX WSS and DEMUX WSS comprise the same type of optical element (e.g., the WSS 108). However, persons having ordinary skill in the art will understand that the MUX WSS and the DEMUX WSS may comprise different types of optical elements. The multiplexing and de-multiplexing functionality of the WSSs 108 may be implemented using a variety of technologies, such as LCOS, MEMS arrays, etc.

In some implementations, as shown in FIG. 2E, the optical signals/passbands entering the WSS 108 may first pass through an optical splitter 224 (constructed in accordance with the optical splitter 190 described above) operable to direct a sample signal (of the optical signal) to a photodetector 226, such as a photodiode, and allow a remainder of the optical signal to continue to the tributary port 220 of the WSS 108. The photodetector 226 may be operable to detect an optical power of the portion of the optical signal (e.g., of the passband) to detect an optical loss of signal of the optical signal. The photodetectors 226 may be constructed in accordance with the one or more balanced photodiodes 176 discussed above in more detail.

Figure 3:
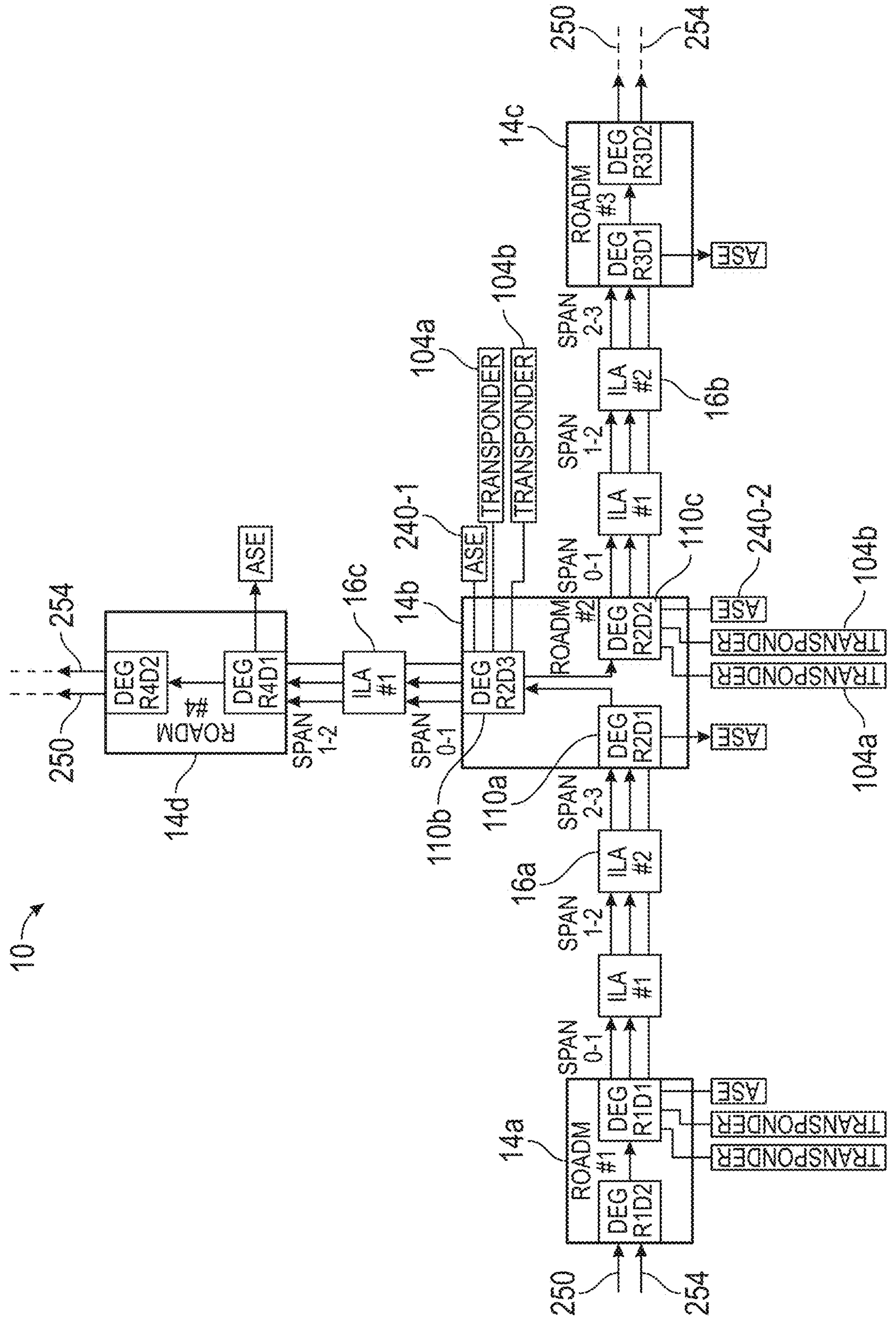
FIG. 3 is a diagram of an exemplary implementation of the second network element in use in the optical transport network of FIG. 1A, constructed in accordance with the present disclosure.

Referring now to FIG. 3, shown therein is a diagram of an exemplary implementation of the second network element 14*b* in use in the optical transport network 10 of FIG. 1A, constructed in accordance with the present disclosure. As shown, the second network element 14*b* may be considered a three-degree ROADM, each degree being associated with a particular ROADM 110, for example, a first degree associated with the first ROADM 110*a*, a second degree associated with the second ROADM 110*b*, and a third degree associated with the third ROADM 110*c*. Additionally, the optical transport network 10 is shown as a C+L band network having C-band traffic 250 and L-band traffic 254. Further shown in FIG. 3, a first ASE idler 240-1 is provided and optically coupled to the second ROADM 110*b* and a second ASE idler 240-2 is provided and optically coupled to the third ROADM 110*c*. It should be understood that, for simplification, only unidirectional traffic shown in FIG. 3.

Figure 4:
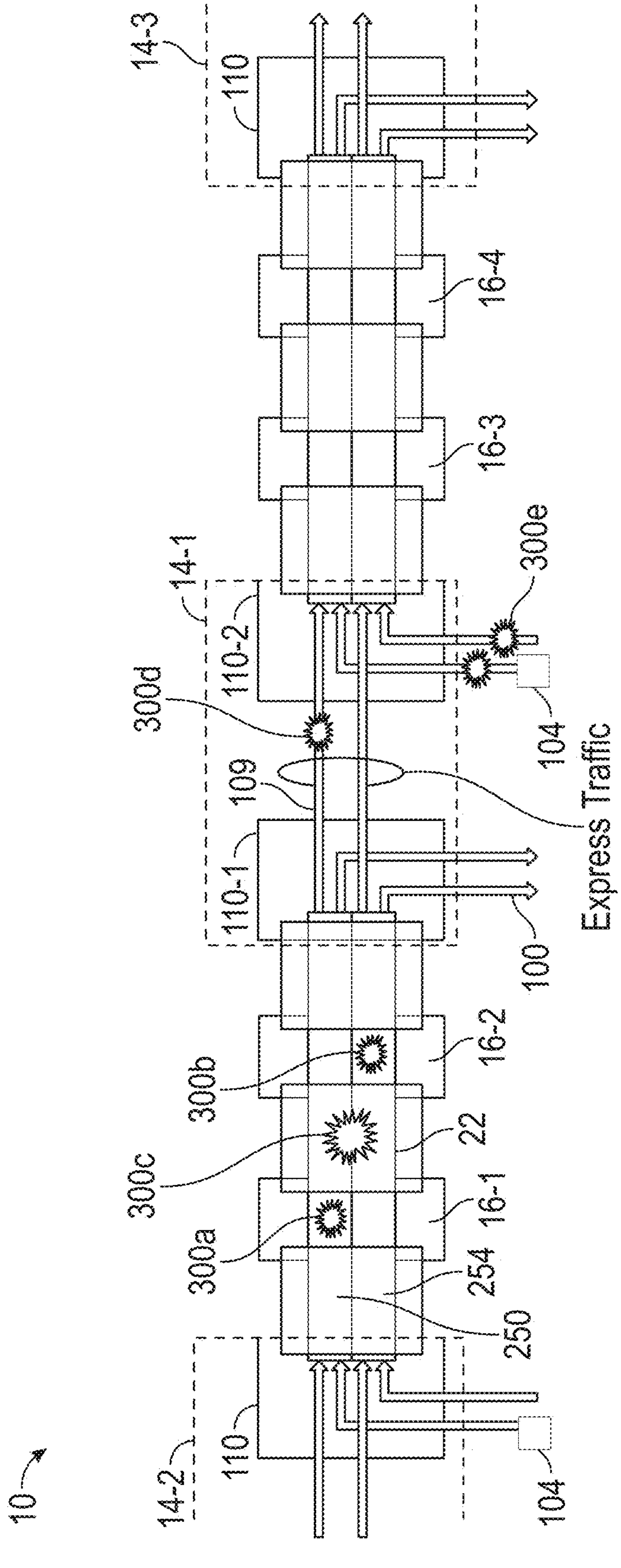
FIG. 4 is an exemplary implementation of the optical transport network having one or more failure.

Referring now to FIG. 4, shown therein is an exemplary implementation of the optical transport network 10 having one or more failure 300. As shown in FIG. 4, the one or more failure 300 may occur at various locations throughout the optical transport network 10 and may originate from multiple sources. Exemplary failures 300 may include, for example, transponder failures, multiplexor failures (e.g., light source 104 and light sink 100 failures), patch cord cuts, span failures, and band-level failures. Each of the failures 300 may be referred to, for example, as spectrally resolved traffic failures due to the nature of the failures being identifiable by monitoring the spectra of the optical signal. It should be understood that the one or more failures 300, and the locations of the one or more failures 300, shown in FIG. 4 are shown for illustrative purposes only and the location of each failure 300 within the optical transport network 10 should not be considered limiting. For example, a failure 300 shown in a particular ILA 16 may occur in a different one of the ILAs 16 of the optical transport network 10. Further, while the optical transport network 10 is shown with multiples of the failures 300, it should be understood that not all of the failures 300 may be present within the optical transport network 10 simultaneously. In one implementation, a particular failure 300 that occurs within the network element 14 or in in an upstream transmission line segment 22 may be referred to as a local passband failure.

For example, one or more of the failures 300 may occur upstream from a network element 14-1, such as a C-band failure 300*a* in an upstream ILA 16, shown as in an ILA 16-1, an L-band failure 300*b* may occur in another upstream ILA 16, shown as in an ILA 16-2, a link failure 300*c* may occur in an upstream transmission line segment 22. While described in relation to the network element 14-1, it should be understood that the network element 14-1 is provided for exemplary purposes only, and the failures 300 described herein may occur in relation to any of the network elements 14 described herein.

Additionally, the one or more failure 300 may occur within, or originate at, the network element 14-1. For example, an express failure 300*d* may occur within the network element 14-1, such as a failure of an express link 109 between two respective ROADMs 110 (e.g. a first ROADM 110-1 and a second ROADM 110-2) of the network element 14-1. Further, a service failure 300*e* may occur between the light source 104 and a particular ROADM 110 or may occur because of a failure of the light source 104.

The one or more failures 300 may be detected in a multitude of ways. For example, by measuring an optical power of an optical signal based on an add/drop multiplexor port power an optical loss of signal (OLOS) condition can be detected, by measuring the ROADM's tributary port to detect an optical power of the optical signal going into OLOS, or by monitoring the band spectrum, or C+L band spectrum, of the optical signal using the spectrally-resolved measurement device 198 to measure the individual status/optical power of each passband to detect passband-level OLOS. The OLOS condition may be indicative of, for example, a particular passband having an optical power less than an expected optical power or OLOS threshold. Additionally, in some implementations, the one or more failures 300 may be detected by a downstream network element 14-3 and the network element 14-1 may be alerted to the one or more failure 300 via a control-plane notification, e.g., received via the OSC 200, indicative of a passband failure. Moreover, in some implementations, the one or more failures 300 detected in the network element 14-1 may be communicated to either an upstream network element 14-2 or the downstream network element 14-3 via a control-plane notification, e.g., via the OSC 200.

Figure 5A:
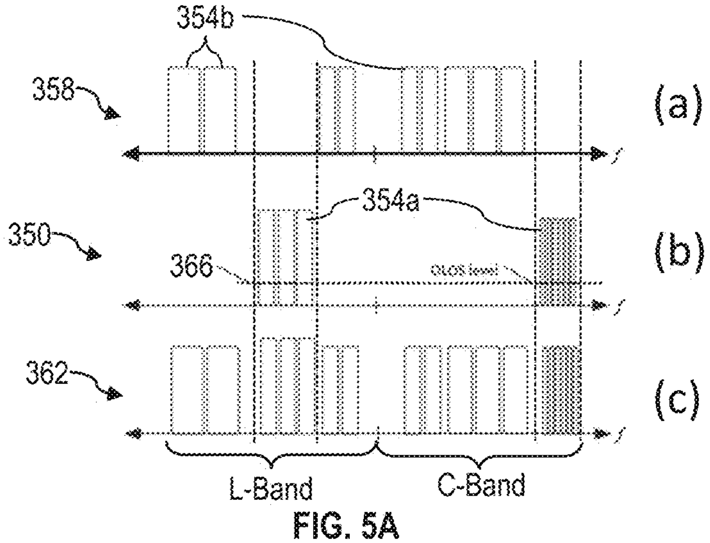
FIG. 5A is a spectrum graph of an exemplary implementation of respective optical signals passing though the network element without the one or more failures of FIG. 4.

Referring now to FIGS. 5A, shown is a spectrum graph of an exemplary implementation of respective optical signals having user signal passbands (USPs) passing through a particular network element 14 without the one or more failures 300 of FIG. 4. An input optical spectrum 350 is shown in spectrum graph (b) of FIG. 5A for a first optical signal received by the network element 14 and having user signal passbands 354*a* in the L-band and the C-band spectrums. A second optical spectrum 358 is shown in spectrum graph (a) of FIG. 5A for a second optical signal generated by the light source 104 and having user signal passbands 354*b* loaded in the L-band and the C-band spectrums. Each of the user signal passbands 354 may be a passband within a particular optical signal having user data loaded thereon. Finally, an output optical spectrum 362 is shown in spectrum graph (c) of FIG. 5A for a combined optical signal measured after a particular WSS 108 of a particular ROADM 110 combines the user signal passbands 354*a* of the first optical signal having the input optical spectrum 350 with the user signal passbands 354*b* of the second optical signal having the second optical spectrum 358. As shown in FIG. 5A, the output optical spectrum 362 includes both the user signal passbands 354*a* of the first optical signal and the user signal passbands 354*b* of the second optical signal. Further shown in FIG. 5A is an OLOS level power 366, referred to, for example, as an OLOS level, that is, an optical power level, below which, the passband and/or optical signal is considered as failed, or having a failure.

Figure 5B:
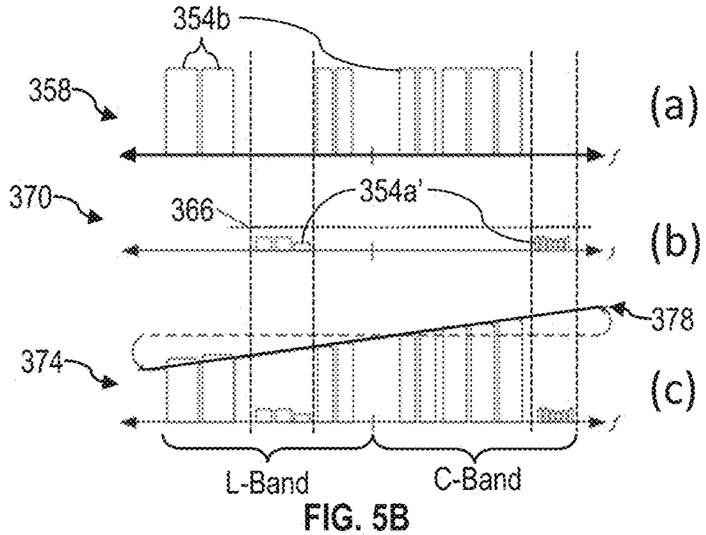
FIG. 5B is a spectrum graph of an exemplary implementation of respective optical signals passing though the network element with the one or more failures of FIG. 4.

Shown in FIG. 5B is a spectrum graph of an exemplary implementation of respective optical signals passing though the network element 14 with the one or more failures 300 of FIG. 4. A failed input optical spectrum 370 is shown in spectrum graph (b) of FIG. 5B for the first optical signal received by the network element 14 and having user signal passbands 354*a* in the L-band and the C-band spectrums. The failed input optical spectrum 370 of the first optical signal is shown as having a diminished optical power due to the one or more failures 300 (such as a link failure 300*c*).

The second optical spectrum 358 is shown in spectrum graph (a) of FIG. 5B for the second optical signal generated by the light source 104 and having the user signal passbands 354*b* loaded in the L-band and the C-band spectrums, similar to the second optical signal of FIG. 5A. Finally, an uncompensated output optical spectrum 374 is shown in spectrum graph (c) of FIG. 5B for a combined optical signal measured after a particular WSS 108 of a particular ROADM 110 combines the user signal passbands 354*a* of the first optical signal having the failed input optical spectrum 370 with the user signal passbands 354*b* of the second optical signal having the second optical spectrum 358.

As shown in FIG. 5B, the uncompensated output optical spectrum 374 includes both the user signal passbands 354*a* of the first optical signal and the user signal passbands 354*b* of the second optical signal; however, the user signal passbands 354*a* (and the first optical signal) have an optical power below the OLOS level power 366, as shown in the spectrum graph (b) of FIG. 5B resulting in the user signal passbands 354*a* being considered failed user signal passbands 354*a*'. Due to the failed user signal passbands 354*a*' (and the first optical signal) having the optical power below the OLOS level power 366, the combined optical spectrum experiences an induced optical tilt 378 due to stimulated Raman scattering, or nonlinear noise, within the uncompensated output optical spectrum 374. Further, the uncompensated output optical spectrum 374 traveling though the optical transport network 10 from the network element 14 to a downstream network element 14-3 causes the optical transport network 10 to operate with sub-optimal amplifier gain and tilt settings (e.g., of ILAs 16) thereby degrading system performance. To quickly compensate for the one or more failures 300, the node processor 90 and/or the controller 185 may execute an ASE passband protection process 400 (shown in FIG. 6 and discussed in detail below).

Figure 5C:
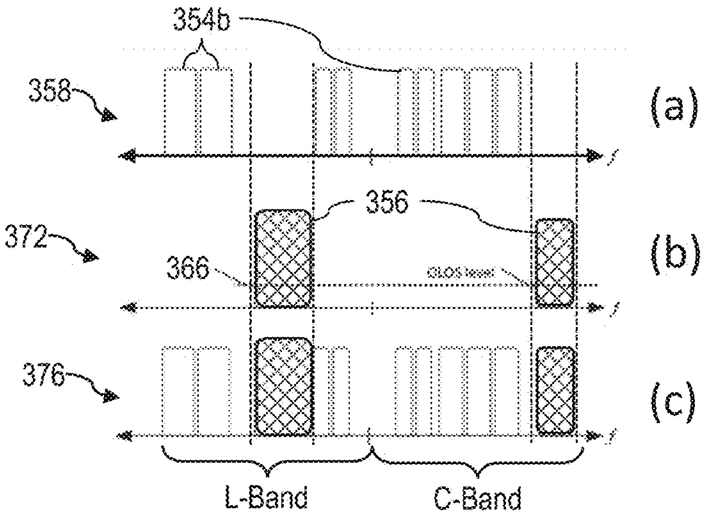
FIG. 5C is a spectrum graph of an exemplary implementation of an optical signal passing though the network element with the one or more failures of FIG. 4 being compensated for with an ASE passband protection process.

Referring now to FIG. 5C, shown therein is a spectrum graph of an exemplary implementation of an optical signal passing though the network element 14 with the one or more failures 300 of FIG. 4 being compensated for with the ASE passband protection process 400. An ASE optical spectrum 372 is shown in spectrum graph (b) of FIG. 5C as generated by the WSS 108 and having ASE passbands 356 in the L-band and the C-band spectrums. The ASE optical spectrum 372 is shown as having an optical power exceeding that of the OLOS level power 366. The second optical spectrum 358 is shown in spectrum graph (a) of FIG. 5C for the second optical signal generated by the light source 104 and having the user signal passbands 354*b* loaded in the L-band and the C-band spectrums, similar to the second optical signal of FIG. 5A. Finally, a compensated output optical spectrum 376 is shown in spectrum graph (c) of FIG. 5C for a combined optical signal measured after a particular WSS 108 of a particular ROADM 110 combines the ASE passbands 356 having the ASE optical spectrum 372 with the user signal passbands 354*b* of the second optical signal having the second optical spectrum 358. As shown, the compensated output optical spectrum 376 does not experience the induced optical tilt 378 due to stimulated Raman scattering as a result of the failed passbands 354*a*'.

Figure 6:
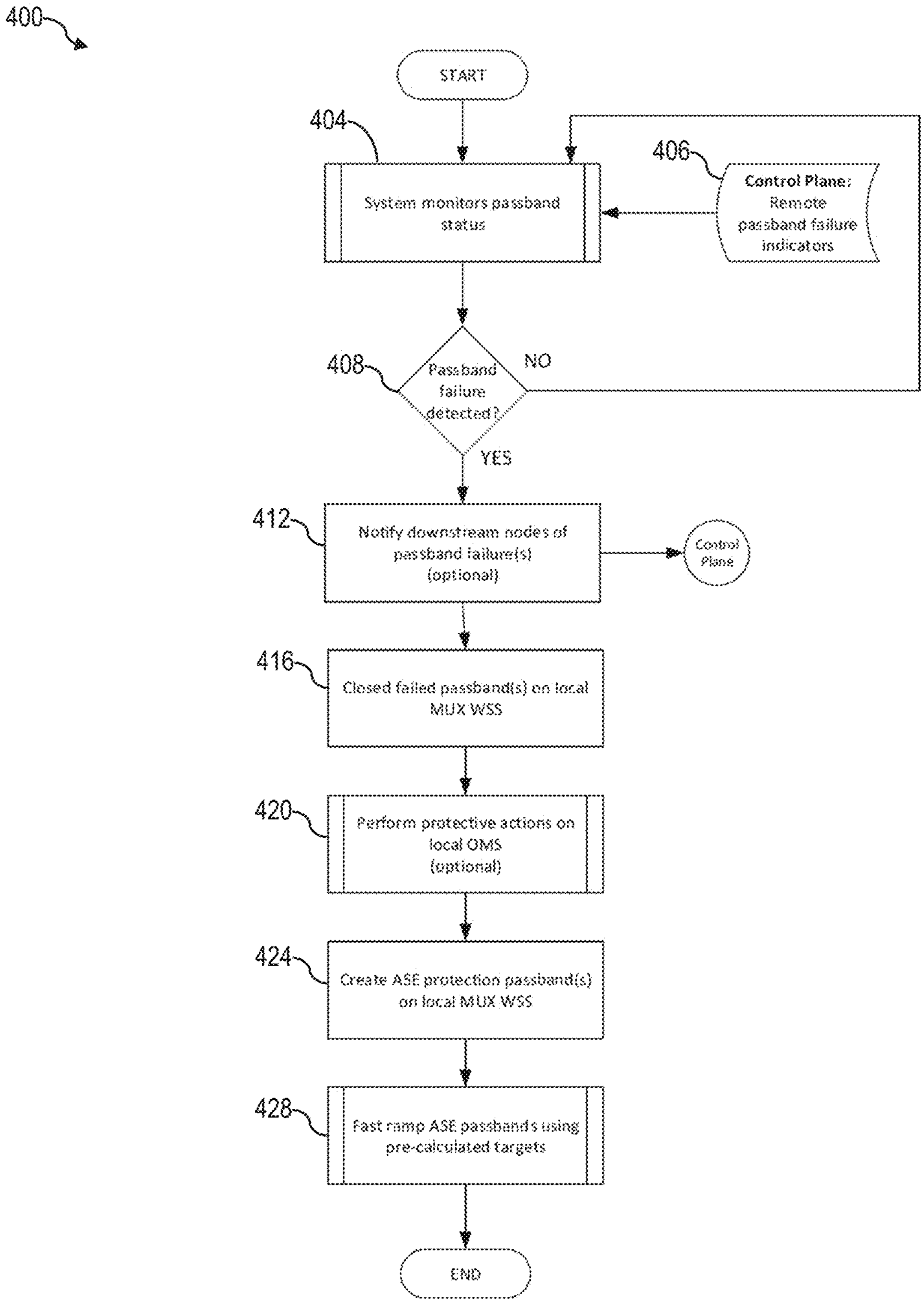
FIG. 6 is a process flow diagram of an exemplary implementation of the ASE passband protection process constructed in accordance with the present disclosure.

Referring now to FIG. 6, shown therein is a process flow diagram of an exemplary implementation of the ASE passband protection process 400 constructed in accordance with the present disclosure. The ASE passband protection process 400 generally comprises: monitoring a passband status (step 404); detecting a passband failure (step 408); (optionally) notifying downstream network elements of passband failures (step 412); deactivating failed passbands locally (step 416); (optionally) performing protective actions on the local OMS (step 420); creating an ASE passband locally (step 424); and activating the ASE passband (step 428). Each step of the ASE passband protection process 400 may be performed, for example, by the node processor 90 and/or the controller 185 in communication with other components of the network element 14 and/or the ROADM 110, respectively. The ASE passband protection process 400 may be stored, for example, as processor-executable instructions stored in the node memory 94 and/or the ROADM memory 188 in communication with the node processor 90 and/or the ROADM processor 186, respectively. Hereinafter, reference to the ROADM processor 186 performing one or more step or action further includes the node processor 90 performing the same step or action, e.g., in communication with the ROADM processor 186 and/or a requisite component of the ROADM 110.

In one implementation, monitoring the passband status (step 404) may include monitoring an optical power of the optical signal as the optical signal passes through the network element 14. For example, the ROADM processor 186 monitoring one or more of the spectrally-resolved measurement device 198, an optical power of an optical signal passing through one of the WSSs 108 (e.g., the first WSS **108*a* or the second WSS 108*b*), a tributary port of the ROADM 110, and/or the like. In some implementations, monitoring a passband status (step 404) may further include monitoring an optical power of one or more passband of the optical signal. In further implementations, monitoring a passband status (step 404**) may include monitoring an optical power of the C-band, the L-band, or both the C+L bands.

In one implementation, monitoring the passband status (step 404) may further include the ROADM processor 186 receiving a control-plane notification 406, e.g., received via the OSC 200, indicative of a passband failure upstream from the network element 14. For example, the ROADM processor 186 may communicate with the OSC 200 to monitor control-plane notifications to receive the indication of a passband failure that has occurred upstream from the network element 14, e.g., from the upstream network element 14-2.

In one implementation, detecting the passband failure (step 408) may include comparing the optical power, such as the optical power received from the spectrally-resolved measurement device 198, to an expected power of a last known good operating condition. The expected power may be, for example, greater than an OLOS level, that is, an optical power level, below which, the passband and/or optical signal is considered as failed, or having a failure. In some implementations, the expected power may be the optical power of the optical signal, or a particular passband within the optical signal, detected at a prior (known-good) point in time (e.g., the known good operating condition), that is, detected as a point in time during which it is known that the particular optical signal, or particular passband, is not in a failed state.

In one implementation, detecting the passband failure (step 408) may include receiving the control-plane notification, e.g., received via the OSC 200, indicative of the passband failure.

In one implementation, (optionally) notifying downstream network elements of passband failures (step 412) may include, for example, the ROADM processor 186 generating a control-plane notification indicative of the passband failure (including, for example, an identified of the failed passband such as one or more of a sequence number, a start frequency, an end frequency, a passband bandwidth, and/or the like, or a combination thereof). The control-plane notification may be provided by the ROADM processor 186 to the OSC 200 and transmitted to downstream network elements 14-3, for example. In this way, downstream network elements 14-3 may react quickly to locally (e.g., at the network element 14) detected passband failures without having to manually detect the passband failure using the spectrally-resolved measurement device 198 of the downstream network element 14-3. Thus, detection of the passband failure at a particular network element 14 may result in correction for the passband failure at each network element 14 downstream from the passband failure caused by the one or more failure 300.

In one implementation, deactivating failed passbands locally (step 416) may include, for example, the ROADM processor 186 causing the second WSS **108*b*, e.g., the multiplexor WSS, to deactivate the failed passband. The second WSS 108*b*** may deactivate a failed passband by, for example, attenuating the optical spectrum associated with the failed passband in the optical signal, as described above in more detail.

Figure 7:
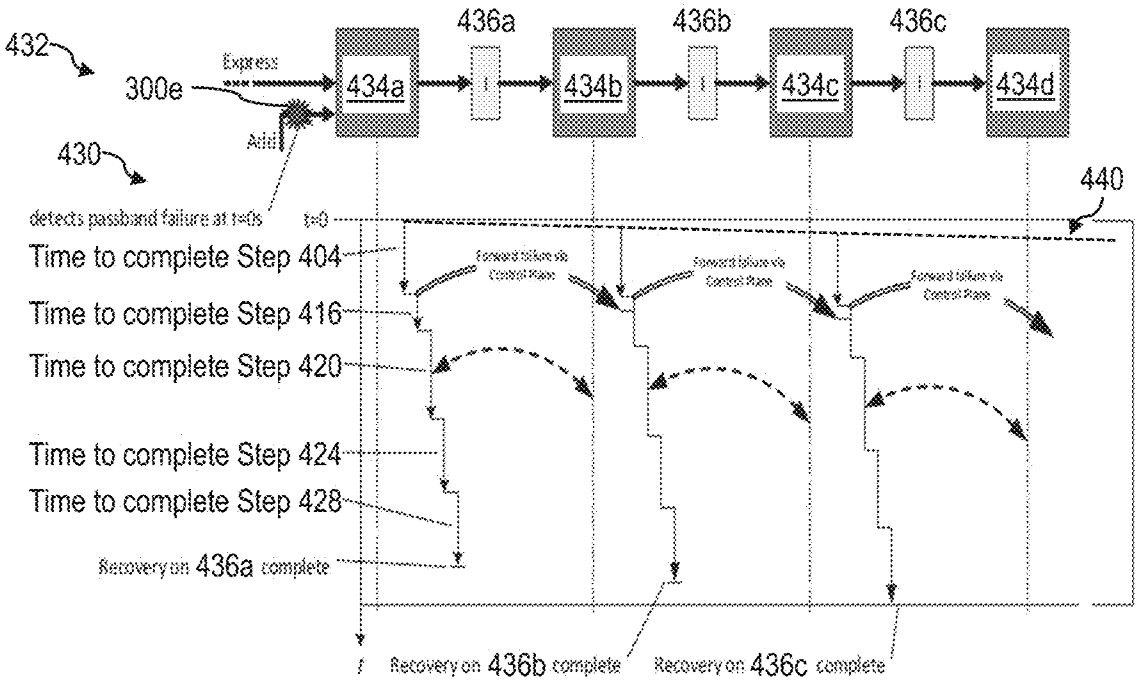
FIG. 7 is a timing diagram of a passband failure recovery in accordance with the present disclosure.

In one implementation, performing protective actions on the local OMS (step 420) may be optional to the ASE passband protection process 400. In one implementation, performing protective actions on the local OMS (step 420) may include deactivating the first WSS **108*a* (e.g., demux WSS) passbands for failed services to prevent one or more ASE passband from propagating into downstream transmission line segments 22. Performing protective actions on the local OMS may impact both recovery time and network-level consistency. In this way, all injected ASE passbands are confined to one transmission line segment 22, thereby providing separation of the ASE passbands 356 between transmission line segments 22. By deactivating the demux WSS failed passbands, recovery across the optical network is consistent and an optical network system state is deterministic, albeit at a cost in terms of the timing it takes to monitor the optical signal and user signal passbands 354 expected in the optical signal and activating the ASE passband 356 as shown in FIG. 7 and discussed in detail below. Further, since all recovery is managed at the network element 14 level, no network-wide recovery, and resulting management overhead, is required, thereby simplifying recovery from the ASE passbands 356 to the user signal passbands 354** once the failed passband is recovered.

In one implementation, performing protective actions on the local OMS (step 420) may include leaving demux passbands open such that ASE passbands propagate across the optical transport network 10 into downstream transmission line segments 22. In this case, if the failure 300 is only detected at ADD sites (e.g., at mux WSSs), leaving demux passbands open allows the ASE passband injected into the optical signal to traverse the optical transport network 10, thereby recovering the optical signal more quickly than distributed ASE passband injection where each network element 14 performs the ASE passband protection process 400 independently. Leaving demux passbands open may, however, result in race conditions when multiples of the network elements 14 in the optical transport network 10 detect the passband failure. Further, leaving demux passbands open will result in more complicated recovery mechanisms for replacing the ASE passband with a user signal passband without causing a short-term transient state, once the user signal passband has recovered. The more complicated recovery mechanism would require transition from the ASE passband to the user signal passband management via the control plane layer (e.g., the OSC 200), which may lead to additional overhead and system transients when each network element 14 transitions from network-wide ASE passband injection to local, ASE passband injection at the network elements 14.

In one implementation, creating the ASE passband (step 424) may include, for example, the ROADM processor 186 causing the ASE idlers 240 to generate the ASE noise and to cause the second WSS 108*b* to shape the received ASE noise into one or more ASE passband having an optical power similar to the expected power of the failed passband as described below in reference to FIG. 10. In some implementations, the ASE passband may replace both single-carrier and multi-carrier user signal passbands 354.

In one implementation, creating the ASE passband locally (step 424) may further include for example, the ROADM processor 186 causing the ASE idlers 240 to generate the ASE noise and to cause the second WSS 108*b* to shape the received ASE noise into one or more ASE passband having an ASE bandwidth similar to a bandwidth of the failed passband as shown in FIG. 8 and detailed below.

In one implementation, creating the ASE passband locally (step 424) may include the ROADM processor 186 causing the second WSS 108*b* to shape the received ASE noise into one or more ASE passband having a particular spectral shape based on the failed passband as shown in FIGS. 8A-D and described in more detail below.

In one implementation, activating the ASE passband (step 428) may include the ROADM processor 186 causing the WSS 108 to adjust the ASE passband optical power by, for example, reducing attenuation of the ASE passband, such that a time it takes to ramp the ASE passband from full attenuation to the target power is minimized without exceeding the target power.

Figure 10:
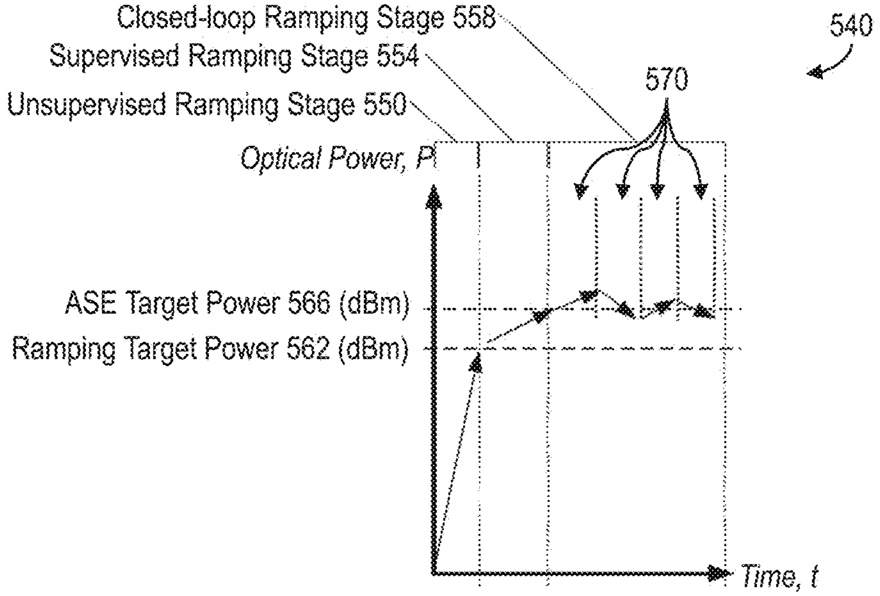
FIG. 10 is an illustration of an exemplary implementation of a timing diagram of a multi-stage ramp-up of the ASE passband constructed in accordance with the present disclosure.
Figure 11:
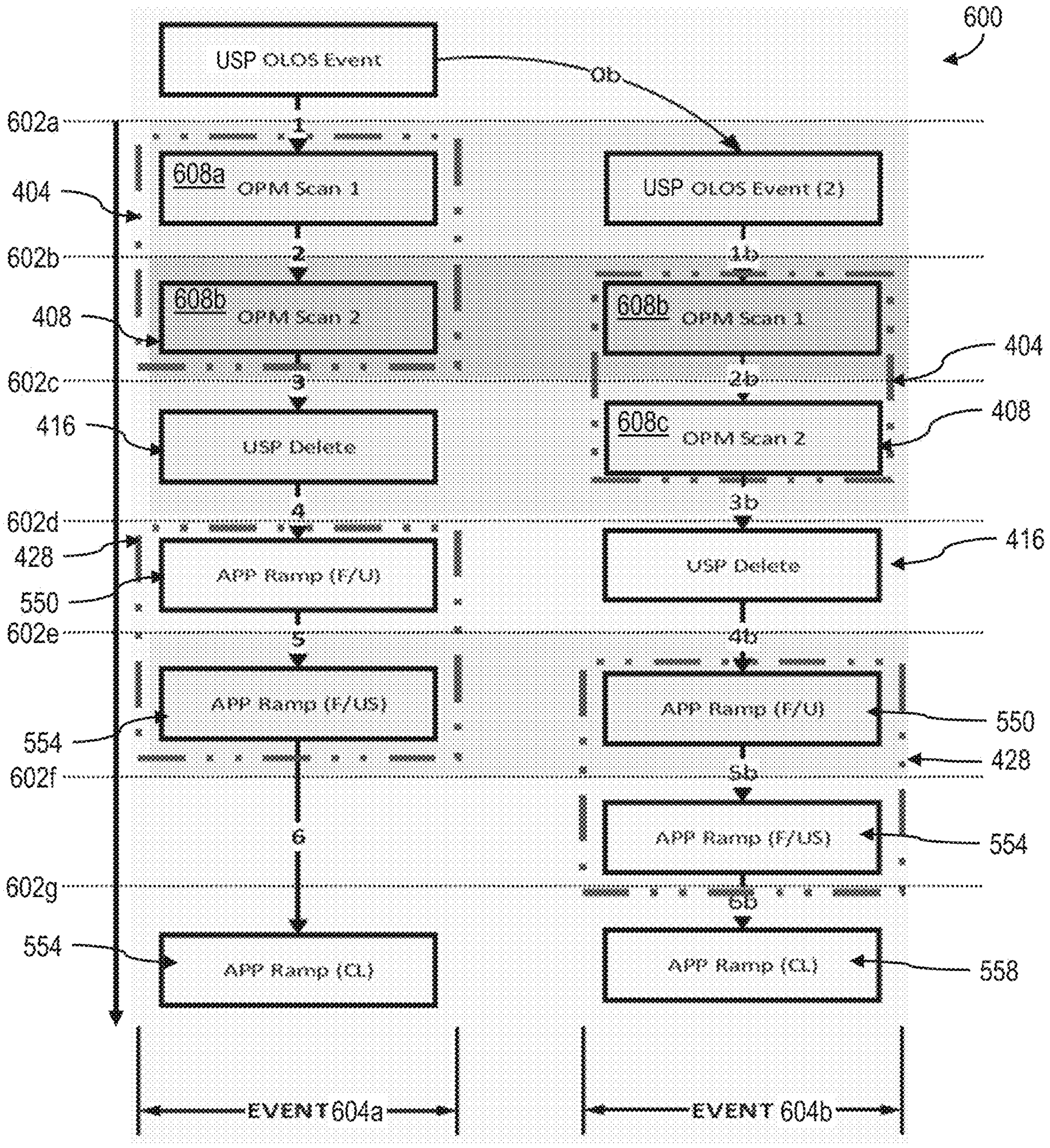
FIG. 11 is an exemplary implementation of a timing diagram having multiple point in time of an exemplary implementation of parallelized execution of the ASE passband protection process for a first OLOS event and a second OLOS event constructed in accordance with the present disclosure.

In one implementation, activating the ASE passband (step 428) may include the ROADM processor 186 causing the WSS 108 to ramp-up the ASE passband in multiple stages: an unsupervised ramping stage 550, a supervised ramping stage 554, and closed-loop ramping stage 558, as illustrated in timing diagram 540 in FIG. 10. As shown in FIG. 11 and described in more detail below, the ROADM processor 186 may cause the WSS 108 to ramp-up the ASE passband in multiple stages and in parallel in the event of multiple failures 300. In one implementation, the supervised ramping stage 554 may be omitted, resulting in the ROADM processor 186 causing the WSS 108 to ramp-up the ASE passband 356 in two stages: the unsupervised ramping stage 550 and the closed-loop ramping stage 558.

In one implementation, during the unsupervised ramping stage 550, the WSS 108 may ramp the ASE passband to a ramping target power 562 based on a predefined WSS attenuation (e.g., as stored in the ROADM memory 188). In this way, the WSS 108 may set an attenuation for each spectral slice of the ASE passband to the predefined WSS attenuation.

In one implementation, during the supervised ramping stage 554, a spectrum power is captured (e.g., with the spectrally-resolved measurement device 198) to measure an initial ASE power after the unsupervised ramping stage 550. The ROADM processor 186 then calculates a difference between an ASE target power 566 and the measured spectrum power and a single step attenuation correction is performed, that is, the WSS attenuation is changed to be a difference between the ASE target power 566 and the measured spectrum power, less a predefined offset. The predefined offset may be selected to ensure that, after the supervised ramping stage 554, the optical power of the ASE passband does not exceed the ASE target power 566.

In one implementation, during the closed-loop ramping stage 558, the ROADM processor 186 iteratively sets the WSS attenuation for the ASE passband based on a determination of a minimum value between the ASE target power 566 less the measured power of the ASE passband (e.g., a measured ASE power) and a maximum allowed attenuation. In this way, a maximum improvement in the optical power of the ASE passband is limited by a known maximum delta between iterations 570.

By executing the unsupervised ramping stage 550, the ROADM processor 186 may ensure that the ASE passband more quickly substitutes for the failed passband in the optical signal, thereby decreasing the effects of the induced optical tilt 378 without inducing further spectrum changes by overshooting the ASE target power.

Referring now to FIG. 7, shown therein is a timing diagram 430 of a passband failure recovery in accordance with the present disclosure. An optical transport network 432 is shown having a first network element 434*a*, a second network element 434*b*, a third network element 434*c*, and a fourth network element 434*d*, having a first transmission line segment 436*a*, a second transmission line segment 436*b*, and a third transmission line segment 436*c* optical disposed respectively therebetween. The network elements 434 may be constructed in accordance with the network element 14 and the transmission line segments 436 may be constructed in accordance with the transmission line segments 22 as described above in more detail.

The service failure 300*e* is shown as occurring at the first network element 432*a*. The timing diagram also shows a recovery start delay illustrated by dotted line 440 indicating a delay in each network element 434 before identifying the passband failure in relation to a time at which the first network element 434*a* identified the passband failure.

As shown in FIG. 7, system recovery time scales approximately with the time required to detect the failed passband (s) (e.g., in step 408) plus the messaging time to notify downstream dependent ROADMs (e.g., in step 412) plus the time for local actions to be executed on each OMS (e.g., steps 420-428) in parallel. Therefore, an incremental time to recover for additional OMSs in a dependent path is small compared to the time to recover a single OMS. A dependent path may be, for example, an optical path downstream from the failure 300 having the failed passbands 354*a*' in the optical signal within the optical transport network 10, and is shown below in FIG. 9.

Referring now to FIGS. 8A-D, in combination, shown therein are illustrations of an expected shape of a user signal passband and exemplary ASE passband power shapes generated by the second WSS 108*b*. It should be understood that the ASE passband shapes shown in FIGS. 8A-D are not intended to be an exhaustive list of possible passband shapes. It should be understood that one or more of: cross-talk impact on neighboring passbands, non-linear noise penalty on neighboring passbands, required ASE idler power, and shaping profile resolution of the WSS 108 should be considered when selecting a power shape for the shaped ASE passband.

Figure 8A:
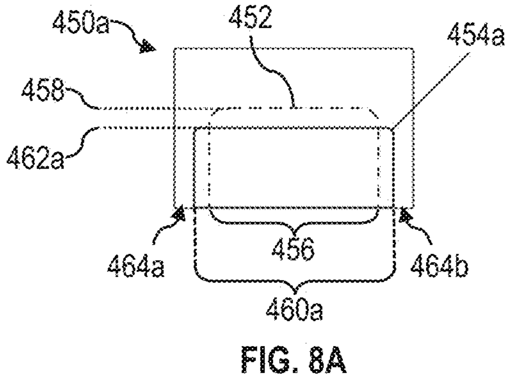
FIG. 8A is an illustration of an exemplary implementation of a first spectrum diagram showing a user signal passband that has failed and a first ASE passband.

Shown in FIG. 8A is a first spectrum diagram 450*a* showing a user signal passband 452 that has failed, e.g., is considered a failed passband, and a first ASE passband 454*a*. The user signal passband 452 is shown having a user bandwidth 456 and an expected power 458. A total power may be calculated for the user signal passband 452 based on the expected power 458 across the user bandwidth 456. The first ASE passband 454*a* is shown as a flat ASE passband with a first ASE bandwidth 460*a* having a first ASE power 462*a*. As shown in FIG. 8A, the first ASE passband 454*a* may include one or more guardband 464, such as a first guardband 464*a* and a second guardband 464*b*, to minimize crosstalk one neighboring passbands. The first ASE passband 454*a* is shown as having a flat power shape, or a rectangular power shape. In some implementations, an attenuation, a target power (e.g., the ASE power 462) and/or the power shape may be precalculated whenever the user signal passband 354 power or attenuation is adjusted by the WSS 108, thereby enabling faster activation of the ASE passband.

Figure 8C:
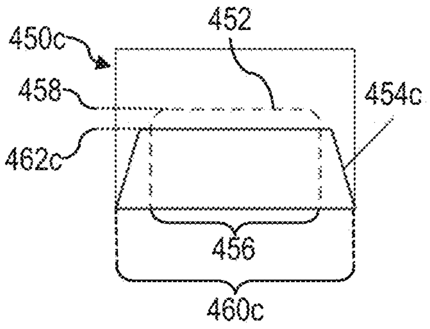
FIG. 8C is an illustration of an exemplary implementation of a third spectrum diagram showing the user signal passband that has failed and a third ASE passband.
Figure 8B:
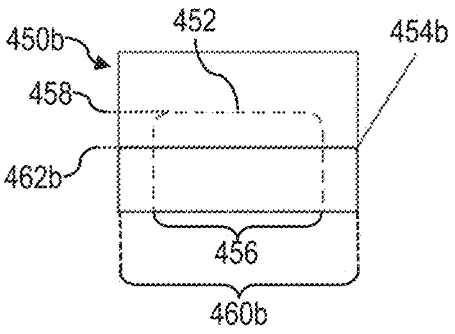
FIG. 8B is an illustration of an exemplary implementation of a second spectrum diagram showing the user signal passband that has failed and a second ASE passband.

Shown in FIG. 8B is a second spectrum diagram 450*b* showing the user signal passband 452 that has failed and a second ASE passband 454*b*. The second ASE passband 454*b* is shown as a flat ASE passband with a second ASE bandwidth 460*b* having a second ASE power 462*b*. As shown in FIG. 8B, the second ASE passband 454*b* may not include the one or more guardband 464, resulting in the second ASE passband 454*b* having the second ASE bandwidth 460*b* being wider than the first ASE bandwidth 460*a*. Further, due to the second ASE bandwidth 460*b* being wider than the first ASE bandwidth 460*a*, the second ASE power 462*b* may be less than the first ASE power 462*a*, even though a total power of the first ASE passband 454*a* and a total power of the second ASE passband 454*b* may be the same or similar. The second ASE passband 454*b* is shown as having a flat power shape, or a rectangular power shape.

Shown in FIG. 8C is a third spectrum diagram 450*c* showing the user signal passband 452 that has failed and a third ASE passband 454*c*. The third ASE passband 454*c* is shown as an arbitrarily shaped ASE passband (e.g., trapezoidal/triangular/pyramidal shape) with a third ASE bandwidth 460*c* having a third ASE power 462*c*. As shown in FIG. 8C, the third ASE passband 454*c* may not include the one or more guardband 464. It should be understood that the ASE passband may be shaped into other fanciful shapes as well. The third ASE passband 454*c* is shown as having a trapezoidal power shape, or a triangular power shape.

Figure 8D:
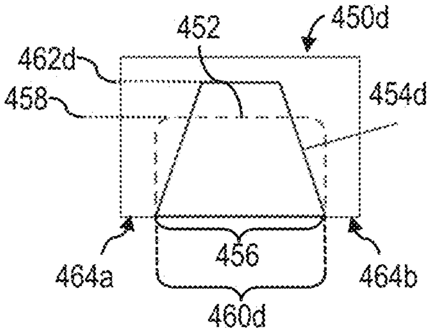
FIG. 8D is an illustration of an exemplary implementation of a fourth spectrum diagram showing the user signal passband that has failed and a fourth ASE passband.

Shown in FIG. 8D is a fourth spectrum diagram 450*d* showing the user signal passband 452 that has failed and a fourth ASE passband 454*d*. The fourth ASE passband 454*d* is shown as an arbitrarily shaped ASE passband with a fourth ASE bandwidth 460*d* having a fourth ASE power 462*d*. As shown in FIG. 8D, the fourth ASE passband 454*d* may include the one or more guardband 464, such as a first guardband 464*a* and a second guardband 464*b*, to minimize crosstalk one neighboring passbands, resulting in the fourth ASE passband 454*d* having the fourth ASE bandwidth 460*d* being narrower than the third ASE bandwidth 460*c*. Further, due to the fourth ASE bandwidth 460*d* being narrower than the third ASE bandwidth 460*c*, the fourth ASE power 462*d* may be greater than the third ASE power 462*c*, even though a fourth total power of the fourth ASE passband 454*d* and a third total power of the third ASE passband 454*c* may be the same or similar. The fourth ASE passband 454*d* is shown as having a trapezoidal power shape, or a triangular power shape.

Figure 9:
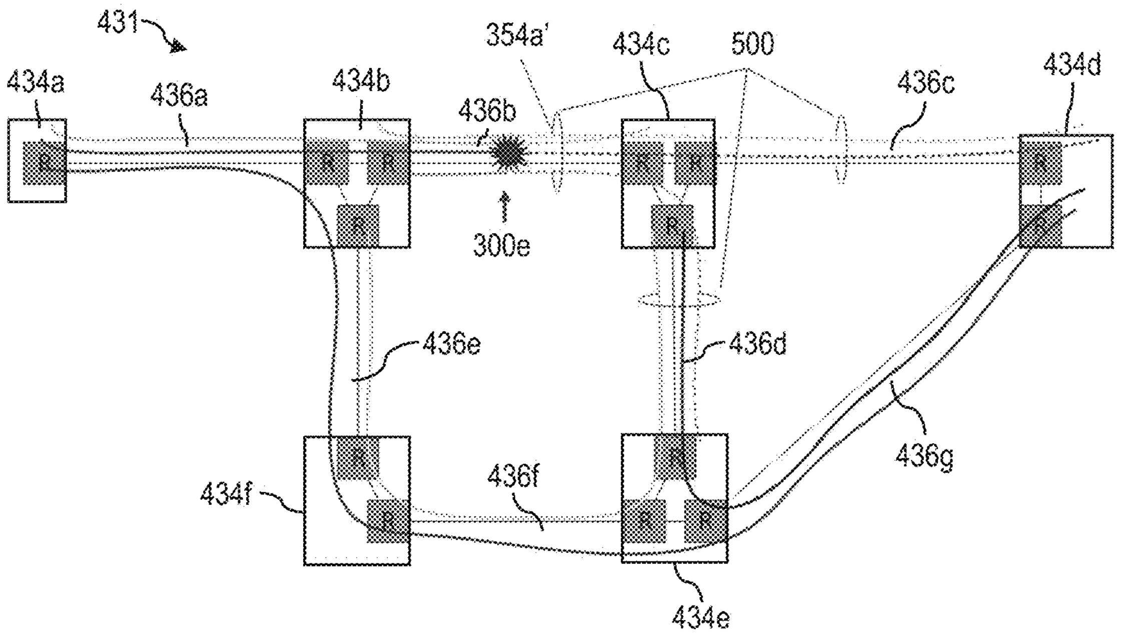
FIG. 9 is an illustration of an exemplary implementation of an optical network having a failure and illustrating resultant dependent paths constructed in accordance with the present disclosure.

Referring now to FIG. 9, shown therein is an illustration of an exemplary implementation of an optical network 431 having a failure 300 and illustrating resultant dependent paths 500. The optical network 431 may be constructed in accordance with the optical transport network 10, detailed above. The optical network 431 comprises a plurality of network elements 434 optically connected by a plurality of transmission line segments 436. As shown, the second network element 434*b* is optically coupled to the third network element 434*c* via the second transmission line segment 436*b*, the third network element 434*c* is further optically coupled to the fourth network element 434*d* via the third transmission line segment 436*c* and to a fifth network element 434*e* via a fourth transmission line segment 436*d*. The second network element 434*b* is further optically coupled to a sixth network element 434*f* via a fifth transmission line segment 436*e* and the sixth network element 434*f* is further optically coupled to the fifth network element 434*e* via a sixth transmission line segment 436*f*. The fourth network element 434*d* is further optically coupled to the fifth network element 434*e* via a seventh transmission line segment 436*g*.

As shown in FIG. 9, the link failure 300*c*, occurring in the second transmission line segment 436*b*, results in the third transmission line segment 436*c* and the fourth transmission line segment 436*d*, having the failed user signal passbands in the optical signal passing thereon, being affected by the link failure 300*c*, therefor the second transmission line segment 436*b*, the third transmission line segment 436*c*, and the fourth transmission line segment 436*d* are considered dependent paths 500.

Referring now to FIG. 11, shown therein is a timing diagram 600 having multiple point in time 602*a-n* of an exemplary implementation of parallelized execution of the ASE passband protection process 400 for a first USP OLOS event 604*a* and a second USP OLOS event 604*b*. Each OLOS event 604 may be, for example, a respective failure 300 of a user signal passband. As shown, after the first OLOS event 604*a* occurs, at time 602*a*, a first power scan 608*a* is performed as part of step 404, and the second OLOS event occurs. As discussed above, in order to confirm that the first OLOS even 604*a* has occurred, at time 602*b* the ROADM processor 186 executing step 408 may cause a second power scan 608*b* to be performed. The second power scan 608*b* may be coordinated such that the second power scan 608*b* is executed as a monitoring scan in step 404 associated with the second OLOS event 604*b* at the same point in time 602*b*.

At time 602*c*, the ROADM processor 186 may execute step 416 associated with the first OLOS event 604*a*, while also performing a third power scan 608*c* associated with the second OLOS event 604*b*.

At time 602*d*, the ROADM processor 186 may begin activating a first ASE passband (step 428) associated with the first OLOS event 604*a* and deactivate a second user passband associated with the second OLOS event 604*b*. At time 602*d*, as part of activating the first ASE passband, the ROADM processor 186 may enter the unsupervised ramping stage 550 associated with the first OLOS event 604*a*.

At time 602*e*, the ROADM processor 186 may begin activating a second ASE passband (step 428) associated with the second OLOS event 604*b* and as part of activating the first ASE passband, the ROADM processor 186 may enter the supervised ramping stage 554 associated with the first OLOS event 604*a*.

At time 602*f*, the ROADM processor 186 may delay starting the closed-loop ramping stage 558 of the first ASE passband associated with the first OLOS even 604*a* while as part of activating the second ASE passband, the ROADM processor 186 may enter the supervised ramping stage 554 associated with the second OLOS event 604*b*.

Finally, at time 602*g*, the ROADM processor 186 may enter the closed-loop ramping stage 558 for both the first ASE passband and the second ASE passband. In this way, the responses to the first OLOS event 604*a* and the second OLOS event 604*b* are synchronized and executed in parallel to reduce a time normally required for the spectrally-resolved measurement device 198 to determine the optical power of the respective ASE passbands.

The following is a list of non-limiting illustrative implementations disclosed herein:

Illustrative implementation 1. A network element, comprising: an amplified spontaneous emission (ASE) source configured to generate ASE noise; a first wavelength selective switch operable to receive a first optical signal from an upstream network element, the first optical signal comprising a plurality of first user signal passbands having an expected optical power; a second wavelength selective switch operable to receive the first optical signal, to attenuate the ASE noise into an ASE passband, and to selectively multiplex the first optical signal and the ASE passband into a second optical signal having a plurality of second passbands; a spectrally-resolved measurement device operable to detect an optical power of at least one of the first optical signal and the second optical signal; and a controller comprising a processor and a memory, the memory comprising a non-transitory processor-readable medium storing processor-executable instructions that cause the processor to:

receive a power signal from the spectrally-resolved measurement device indicative of the optical power of the first optical signal; detect a passband failure within one or more of the first optical signal and the second optical signal based at least in part on the power signal, the passband failure associated with a failed passband, the failed passband being one of the plurality of first user signal passbands; generate the ASE passband; cause the second wavelength selective switch to multiplex the ASE passband into the second optical signal; and cause the second wavelength selective switch to activate the ASE passband to replace the failed passband.

Illustrative implementation 2. The network element of Illustrative implementation 1, wherein the memory further includes instructions that cause the processor to: notify one or more downstream network elements of the passband failure.

Illustrative implementation 3. The network element of Illustrative implementation 1, wherein the memory further includes instructions that cause the processor to: perform one or more protective actions on a local optical multiplexed section, the protective actions operable to mitigate a transient impact of the passband failure and restore remaining first user signal passbands of the plurality of first user signal passbands to the expected optical power of a last known good operating condition.

Illustrative implementation 4. The network element of Illustrative implementation 3, wherein the one or more protective action includes deactivating one or more passbands received by the first wavelength selective switch on an express path to the second wavelength selective switch.

Illustrative implementation 5. The network element of Illustrative implementation 1, wherein the passband failure includes an optical loss of signal condition based on the power signal from the spectrally-resolved measurement device, the optical loss of power condition indicative of the failed passband having a particular optical power less than the expected optical power.

Illustrative implementation 6. The network element of Illustrative implementation 1, further comprising: a light source operable to generate a third optical signal comprising a plurality of second user signal passbands having an expected optical power, the third optical signal based on user data; and wherein the second wavelength selective switch is further operable to receive the first optical signal and the third optical signal, and to selectively multiplex the first optical signal, the third optical signal, and the ASE passband into the second optical signal.

Illustrative implementation 7. The network element of Illustrative implementation 6, wherein the passband failure may be one of a local passband failure and an upstream passband failure.

Illustrative implementation 8. The network element of Illustrative implementation 7, wherein, the power signal is a first power signal, and for a local passband failure, the instructions further include instructions to: receive a second power signal from the spectrally-resolved measurement device indicative of a second optical power; and detect a second passband failure within one or more of the first optical signal, the second optical signal, and the third optical signal based at least in part on the second power signal.

Illustrative implementation 9. The network element of Illustrative implementation 6, wherein the spectrally-resolved measurement device includes one or more of an optical power monitor and an optical channel monitor disposed between the second wavelength selective switch and at least one of the first wavelength selective switch and the light source.

Illustrative implementation 10. The network element of Illustrative implementation 1, wherein the processor is operable to receive one or more control-plane notification, and wherein the memory further includes instructions causing the processor to: receive a particular control-plane notification indicative of an upstream passband failure; and detect the passband failure within the first optical signal based on the upstream passband failure; the failed passband being within the first optical signal.

Illustrative implementation 11. The network element of Illustrative implementation 10, wherein the memory further stores instructions that cause the processor to: responsive to the particular control-plane notification being indicative of the upstream passband failure, cause the first wavelength selective switch to attenuate the failed passband within the first optical signal on an express path to the second wavelength selective switch; and cause the second wavelength selective switch to combine the ASE passband with the first optical signal having the failed passband attenuated.

Illustrative implementation 12. The network element of Illustrative implementation 11, wherein the memory further stores instructions that cause the processor to: responsive to receiving a second control-plane notification being indicative of the failed passband being restored, cause the first wavelength selective switch to remove the attenuation of the failed passband within the first optical signal; and cause the second wavelength selective switch to attenuate the ASE passband.

Illustrative implementation 13. The network element of Illustrative implementation 1, wherein the passband failure includes one or more of: a C-band failure, a link failure, an L-band failure, an express failure, and a service failure.

Illustrative implementation 14. The network element of Illustrative implementation 1, further comprising an optical splitter and a photodetector, the optical splitter disposed to receive the optical signal as the optical signal enters the first wavelength selective switch and to direct a sample signal to the photodetector, the photodetector being operable to detect an optical power of the sample signal, and wherein the instruction to detect the passband failure includes instructions to: detect an optical loss of signal of the optical signal based on the optical power of the sample signal.

Illustrative implementation 15. The network element of Illustrative implementation 1, wherein the instruction to generate the ASE passband includes instructions to: generate the ASE passband as a shaped ASE passband having a total optical power based on the expected optical power of the failed passband.

Illustrative implementation 16. The network element of Illustrative implementation 15, wherein the user signal passband has a user signal bandwidth, and wherein the shaped ASE passband has an ASE bandwidth similar to the user signal bandwidth.

Illustrative implementation 17. The network element of Illustrative implementation 15, wherein the shaped ASE passband includes one or more guardband.

Illustrative implementation 18. The network element of Illustrative implementation 15, wherein the shaped ASE passband has one of: a flat power shape, and a trapezoidal power shape.

Illustrative implementation 19. The network element of Illustrative implementation 1, wherein the instruction to cause the second wavelength selective switch to activate the ASE passband includes instructions to: perform an unsupervised ramping of the ASE passband using a predefined WSS attenuation of the second wavelength selective switch; measure an initial ASE power of the ASE passband using the spectrally-resolved measurement device; and perform a supervised ramping of the ASE passband from the initial ASE power to an ASE target power based on a difference between the initial ASE power and the ASE target power, wherein the ASE target power is based on the expected power of the failed passband.

Illustrative implementation 20. The network element of Illustrative implementation 19, wherein the instruction to cause the second wavelength selective switch to activate the ASE passband includes instructions to: iteratively attenuate the ASE passband to cause a measured ASE power of the ASE passband to converge to the target power.

Illustrative implementation 21. The network element of Illustrative implementation 1, wherein the instruction to cause the second wavelength selective switch to activate the ASE passband includes instructions to: perform an unsupervised ramping of the ASE passband using a predefined WSS attenuation of the second wavelength selective switch; wherein the ASE target power is based on the expected power of the failed passband.

Illustrative implementation 22. The network element of Illustrative implementation 21, wherein the instruction to cause the second wavelength selective switch to activate the ASE passband includes instructions to: iteratively attenuate the ASE passband to cause a measured ASE power of the ASE passband to converge to the target power.

Illustrative implementation 23. The network element of Illustrative implementation 1, wherein the instruction to cause the second wavelength selective switch to activate the ASE passband includes instructions to: iteratively attenuate the ASE passband to cause a measured ASE power of the ASE passband to converge to the target power.

Illustrative implementation 24. The network element of Illustrative implementation 1, wherein the instruction to cause the second wavelength selective switch to activate the ASE passband includes instructions to: perform an unsupervised ramping of the ASE passband using a predefined WSS attenuation of the second wavelength selective switch.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept (s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:

an amplified spontaneous emission (ASE) source configured to generate ASE noise;

a first wavelength selective switch operable to receive a first optical signal from an upstream network element, the first optical signal comprising a plurality of first user signal passbands having an expected optical power;

a second wavelength selective switch operable to receive the first optical signal, to attenuate the ASE noise into an ASE passband, and to selectively multiplex the first optical signal and the ASE passband into a second optical signal having a plurality of second passbands;

a spectrally-resolved measurement device operable to detect an optical power of at least one of the first optical signal and the second optical signal; and a controller comprising a processor and a memory, the memory comprising a non-transitory processor-readable medium storing processor-executable instructions that cause the processor to:

receive a power signal from the spectrally-resolved measurement device indicative of the optical power of the first optical signal;

detect a passband failure within one or more of the first optical signal and the second optical signal based at least in part on the power signal, the passband failure associated with a failed passband, the failed passband being one of the plurality of first user signal passbands;

generate the ASE passband;

cause the second wavelength selective switch to multiplex the ASE passband into the second optical signal; and cause the second wavelength selective switch to activate the ASE passband to replace the failed passband.

2. The network element of claim 1, wherein the memory further includes instructions that cause the processor to:

notify one or more downstream network elements of the passband failure.

3. The network element of claim 1, wherein the memory further includes instructions that cause the processor to:

perform one or more protective actions on a local optical multiplexed section, the protective actions operable to mitigate a transient impact of the passband failure and restore remaining first user signal passbands of the plurality of first user signal passbands to the expected optical power of a last known good operating condition.

4. The network element of claim 3, wherein the one or more protective action includes deactivating one or more passbands received by the first wavelength selective switch on an express path to the second wavelength selective switch.

5. The network element of claim 1, wherein the passband failure includes an optical loss of signal condition based on the power signal from the spectrally-resolved measurement device, the optical loss of power condition indicative of the failed passband having a particular optical power less than the expected optical power.

6. The network element of claim 1, further comprising:

a light source operable to generate a third optical signal comprising a plurality of second user signal passbands having an expected optical power, the third optical signal based on user data; and wherein the second wavelength selective switch is further operable to receive the first optical signal and the third optical signal, and to selectively multiplex the first optical signal, the third optical signal, and the ASE passband into the second optical signal.

7. The network element of claim 6, wherein the passband failure is a local passband failure, and the power signal is a first power signal, and the instructions further include instructions to:

receive a second power signal from the spectrally-resolved measurement device indicative of a second optical power; and detect a second passband failure within one or more of the first optical signal, the second optical signal, and the third optical signal based at least in part on the second power signal.

8. The network element of claim 6, wherein the spectrally-resolved measurement device includes one or more of an optical power monitor and an optical channel monitor disposed between the second wavelength selective switch and at least one of the first wavelength selective switch and the light source.

9. The network element of claim 1, wherein the processor is operable to receive one or more control-plane notification, and wherein the memory further includes instructions causing the processor to:

receive a particular control-plane notification indicative of an upstream passband failure; and detect the passband failure within the first optical signal based on the upstream passband failure, the failed passband being within the first optical signal.

10. The network element of claim 9, wherein the memory further stores instructions that cause the processor to:

responsive to the particular control-plane notification being indicative of the upstream passband failure, cause the first wavelength selective switch to attenuate the failed passband within the first optical signal on an express path to the second wavelength selective switch; and cause the second wavelength selective switch to combine the ASE passband with the first optical signal having the failed passband attenuated.

11. The network element of claim 10, wherein the memory further stores instructions that cause the processor to:

responsive to receiving a second control-plane notification being indicative of the failed passband being restored, cause the first wavelength selective switch to remove the attenuation of the failed passband within the first optical signal; and cause the second wavelength selective switch to attenuate the ASE passband.

12. The network element of claim 1, further comprising an optical splitter and a photodetector, the optical splitter disposed to receive the optical signal as the optical signal enters the first wavelength selective switch and to direct a sample signal to the photodetector, the photodetector being operable to detect an optical power of the sample signal, and wherein the instruction to detect the passband failure includes instructions to:

detect an optical loss of signal of the optical signal based on the optical power of the sample signal.

13. The network element of claim 1, wherein the instruction to generate the ASE passband includes instructions to:

generate the ASE passband as a shaped ASE passband having a total optical power based on the expected optical power of the failed passband.

14. The network element of claim 13, wherein the user signal passband has a user signal bandwidth, and wherein the shaped ASE passband has an ASE bandwidth similar to the user signal bandwidth.

15. The network element of claim 1, wherein the instruction to cause the second wavelength selective switch to activate the ASE passband includes instructions to:

perform an unsupervised ramping of the ASE passband using a predefined WSS attenuation of the second wavelength selective switch;

measure an initial ASE power of the ASE passband using the spectrally-resolved measurement device; and perform a supervised ramping of the ASE passband from the initial ASE power to an ASE target power based on a difference between the initial ASE power and the ASE target power, wherein the ASE target power is based on the expected power of the failed passband.

16. The network element of claim 15, wherein the instruction to cause the second wavelength selective switch to activate the ASE passband includes instructions to:

iteratively attenuate the ASE passband to cause a measured ASE power of the ASE passband to converge to the ASE target power.

17. The network element of claim 1, wherein the instruction to cause the second wavelength selective switch to activate the ASE passband includes instructions to:

perform an unsupervised ramping of the ASE passband using a predefined WSS attenuation of the second wavelength selective switch, wherein an ASE target power is based on the expected power of the failed passband.

18. The network element of claim 17, wherein the instruction to cause the second wavelength selective switch to activate the ASE passband includes instructions to:

iteratively attenuate the ASE passband to cause a measured ASE power of the ASE passband to converge to the ASE target power.

19. The network element of claim 1, wherein the instruction to cause the second wavelength selective switch to activate the ASE passband includes instructions to:

iteratively attenuate the ASE passband to cause a measured ASE power of the ASE passband to converge to an ASE target power.

20. The network element of claim 1, wherein the instruction to cause the second wavelength selective switch to activate the ASE passband includes instructions to:

perform an unsupervised ramping of the ASE passband using a predefined WSS attenuation of the second wavelength selective switch.

* * * * *